United States Patent
Malhotra et al.

(10) Patent No.: US 10,409,781 B2
(45) Date of Patent: Sep. 10, 2019

(54) MULTI-REGIME CACHING IN A VIRTUAL FILE SYSTEM FOR CLOUD-BASED SHARED CONTENT

(71) Applicant: Box, Inc., Redwood City, CA (US)

(72) Inventors: Ritik Malhotra, San Jose, CA (US); Tanooj Luthra, San Diego, CA (US); Sri Sarat Ravikumar Tallamraju, Carmichael, CA (US)

(73) Assignee: Box, Inc., Redwood City, CA (US)

( * ) Notice: Subject to any disclaimer, the term of this patent is extended or adjusted under 35 U.S.C. 154(b) by 233 days.

(21) Appl. No.: 15/140,270

(22) Filed: Apr. 27, 2016

(65) Prior Publication Data

US 2016/0321288 A1 Nov. 3, 2016

Related U.S. Application Data

(60) Provisional application No. 62/154,658, filed on Apr. 29, 2015.

(51) Int. Cl.
*G06F 16/182* (2019.01)
*G06F 9/46* (2006.01)
(Continued)

(52) U.S. Cl.
CPC .............. *G06F 16/182* (2019.01); *G06F 9/46* (2013.01); *G06F 12/0891* (2013.01);
(Continued)

(58) Field of Classification Search
CPC ......... G06F 17/30194; G06F 17/30132; G06F 17/30138; G06F 17/30156;
(Continued)

(56) References Cited

U.S. PATENT DOCUMENTS 6,512,529 B1 1/2003 Janssen
6,750,858 B1 6/2004 Rosenstein
(Continued)

OTHER PUBLICATIONS

Kim, Hwanju, et al., "XHive: Efficient Cooperative Caching for Virtual Machines", IEEE Transactions on Computers, vol. 60, No. 1, Jan. 2011, pp. 106-119.*
(Continued)

*Primary Examiner* — Robert Stevens
(74) *Attorney, Agent, or Firm* — Vista IP Law Group, LLP

(57) ABSTRACT

A cloud-based storage server is interfaced with one or more storage devices that store shared content accessible over a network by two or more users. A virtual file system module is delivered to a user device associated with the users. The virtual file system module provides file access facilities that are not available by either the file system on the user device or the file system on the storage server. A virtual file system cache system manager allocates multiple local memory areas on a user device. The multiple local memory areas are managed differently under multiple cache regimes. The management of the cache regime spaces depend from a set of cache access response directives that serve to direct cache management operations pertaining to the movement of data blocks to and/or from the multiple cache regimes. One cache regime space stores shared data that can be used in an offline mode.

20 Claims, 16 Drawing Sheets

(51) Int. Cl.
| | |
|---|---|
| *G06F 16/23* | (2019.01) |
| *G06F 16/172* | (2019.01) |
| *G06F 16/185* | (2019.01) |
| *G06F 16/188* | (2019.01) |
| *G06F 16/17* | (2019.01) |
| *G06F 16/174* | (2019.01) |
| *G06F 16/176* | (2019.01) |
| *G06F 16/957* | (2019.01) |
| *H04L 29/06* | (2006.01) |
| *H04L 29/08* | (2006.01) |
| *G06F 12/0891* | (2016.01) |
| *G06F 12/122* | (2016.01) |
| *H04N 19/40* | (2014.01) |
| *G06F 12/1081* | (2016.01) |
| *G06F 16/242* | (2019.01) |
| *G06F 16/22* | (2019.01) |
| *G06F 16/11* | (2019.01) |

(52) U.S. Cl.
CPC ........ *G06F 12/1081* (2013.01); *G06F 12/122* (2013.01); *G06F 16/113* (2019.01); *G06F 16/172* (2019.01); *G06F 16/1727* (2019.01); *G06F 16/1748* (2019.01); *G06F 16/1774* (2019.01); *G06F 16/183* (2019.01); *G06F 16/185* (2019.01); *G06F 16/188* (2019.01); *G06F 16/196* (2019.01); *G06F 16/22* (2019.01); *G06F 16/23* (2019.01); *G06F 16/2443* (2019.01); *G06F 16/9574* (2019.01); *H04L 63/0428* (2013.01); *H04L 65/602* (2013.01); *H04L 65/607* (2013.01); *H04L 65/80* (2013.01); *H04L 67/06* (2013.01); *H04L 67/1097* (2013.01); *H04L 67/34* (2013.01); *H04N 19/40* (2014.11); *G06F 2212/1016* (2013.01); *G06F 2212/1044* (2013.01); *G06F 2212/154* (2013.01); *G06F 2212/463* (2013.01); *G06F 2212/60* (2013.01); *G06F 2212/657* (2013.01)

(58) Field of Classification Search
CPC ......... G06F 17/30171; G06F 17/30203; G06F 17/30221; G06F 17/30233; G06F 17/30345; G06F 17/30902; G06F 9/46; G06F 12/0891; G06F 12/122; G06F 16/182; G06F 16/23; G06F 16/172; G06F 16/183; G06F 16/185; G06F 16/188; G06F 16/1727; G06F 16/1748; G06F 16/1774; G06F 16/9574; G06F 16/2443; G06F 16/22; G06F 16/196; G06F 16/113; G06F 12/1081; G06F 2212/1044; G06F 2212/154; G06F 2212/60; G06F 2212/1016; G06F 2212/463; G06F 2212/657; H04N 19/40; H04L 63/0428; H04L 65/602; H04L 65/607; H04L 67/06; H04L 67/1097; H04L 67/34
USPC ........................................................ 707/634
See application file for complete search history.

(56) References Cited

U.S. PATENT DOCUMENTS

| | | | |
|---|---|---|---|
| 7,047,309 B2 | 5/2006 | Baumann | |
| 7,694,065 B2* | 4/2010 | Petev | G06F 9/4493 711/6 |
| 7,975,018 B2* | 7/2011 | Unrau | H04L 67/1095 709/213 |
| 8,180,801 B2 | 5/2012 | Zhang | |
| 8,423,606 B1 | 4/2013 | Streeter | |
| 8,489,549 B2* | 7/2013 | Guarraci | G06F 17/30283 707/612 |
| 8,527,549 B2 | 9/2013 | Cidon | |
| 8,634,456 B2 | 1/2014 | Chen | |
| 8,849,761 B2 | 9/2014 | Prahlad | |
| 8,886,894 B2* | 11/2014 | Adl-Tabatabai | G06F 9/466 711/141 |
| 8,948,258 B2 | 2/2015 | Chen | |
| 9,015,470 B2 | 4/2015 | Losev | |
| 9,210,085 B2 | 12/2015 | Harrison | |
| 9,253,166 B2 | 2/2016 | Gauda | |
| 9,288,510 B1 | 3/2016 | Yang | |
| 9,313,510 B2 | 4/2016 | Shivadas | |
| 9,319,678 B2 | 4/2016 | Coudurier | |
| 9,332,050 B2 | 5/2016 | Collard | |
| 9,384,209 B2 | 7/2016 | Kim | |
| 9,392,304 B2 | 7/2016 | Coudurier | |
| 9,444,695 B2 | 9/2016 | Dutta | |
| 9,544,348 B2 | 1/2017 | Devereaux | |
| 9,621,613 B1 | 4/2017 | Huang | |
| 9,628,268 B2 | 4/2017 | Kiang et al. | |
| 9,715,428 B1* | 7/2017 | Morshed | G06F 11/1064 |
| 9,756,022 B2 | 9/2017 | Amiri et al. | |
| 9,811,532 B2 | 11/2017 | Parkison et al. | |
| 9,852,361 B1 | 12/2017 | Prasad | |
| 9,940,241 B1* | 4/2018 | Mehrotra | G06F 3/0613 |
| 9,973,564 B2 | 5/2018 | Dong | |
| 2004/0107319 A1* | 6/2004 | D'Orto | G06F 17/30902 711/133 |
| 2007/0076626 A1 | 4/2007 | Wise | |
| 2008/0098237 A1 | 4/2008 | Dung | |
| 2009/0016445 A1 | 1/2009 | Gao | |
| 2010/0211690 A1 | 8/2010 | Pakzad | |
| 2010/0268840 A1 | 10/2010 | Hiie | |
| 2010/0332479 A1 | 12/2010 | Prahlad | |
| 2011/0066668 A1 | 3/2011 | Guarraci | |
| 2011/0096828 A1 | 4/2011 | Chen | |
| 2011/0194613 A1 | 8/2011 | Chen | |
| 2011/0231519 A1 | 9/2011 | Luby | |
| 2011/0231569 A1 | 9/2011 | Luby | |
| 2011/0238789 A1 | 9/2011 | Luby | |
| 2011/0239078 A1 | 9/2011 | Luby | |
| 2011/0246616 A1 | 10/2011 | Ronca | |
| 2011/0320733 A1* | 12/2011 | Sanford | G06F 12/0871 711/135 |
| 2012/0023249 A1 | 1/2012 | Chen | |
| 2013/0013803 A1 | 1/2013 | Bichot | |
| 2013/0110961 A1* | 5/2013 | Jadhav | G06F 15/167 709/213 |
| 2013/0117418 A1 | 5/2013 | Mutton | |
| 2013/0138810 A1 | 5/2013 | Binyamin | |
| 2013/0223509 A1 | 8/2013 | Tweedale | |
| 2013/0238785 A1 | 9/2013 | Hawk | |
| 2013/0339470 A1* | 12/2013 | Jeswani | H04L 67/1097 709/213 |
| 2014/0006354 A1 | 1/2014 | Parkison et al. | |
| 2014/0118379 A1* | 5/2014 | Hakura | G06T 1/60 345/557 |
| 2014/0119457 A1 | 5/2014 | Macinnis | |
| 2014/0140417 A1 | 5/2014 | Shaffer | |
| 2014/0153909 A1 | 6/2014 | Macinnis | |
| 2014/0177733 A1 | 6/2014 | Coudurier | |
| 2014/0201141 A1 | 7/2014 | Vibhor et al. | |
| 2014/0269932 A1 | 9/2014 | Su | |
| 2014/0281009 A1 | 9/2014 | Moorthy | |
| 2014/0282771 A1 | 9/2014 | Tumuluru | |
| 2014/0324929 A1 | 10/2014 | Mason, Jr. | |
| 2014/0351455 A1 | 11/2014 | McCormick | |
| 2014/0380376 A1 | 12/2014 | Schmidt | |
| 2015/0039726 A1 | 2/2015 | Hoffert | |
| 2015/0067753 A1 | 3/2015 | Shemesh | |
| 2015/0227602 A1 | 8/2015 | Ramu | |
| 2015/0372939 A1 | 12/2015 | Redler, IV | |
| 2016/0014095 A1 | 1/2016 | Strayer | |
| 2016/0065364 A1 | 3/2016 | Amiri et al. | |
| 2016/0103851 A1 | 4/2016 | Dimitrov | |
| 2016/0119657 A1 | 4/2016 | Sun | |
| 2016/0323351 A1 | 4/2016 | Luhra et al. | |
| 2016/0173900 A1 | 6/2016 | Lee | |

(56) References Cited

U.S. PATENT DOCUMENTS

| | | |
|---|---|---|
| 2016/0234282 A1 | 8/2016 | Lederer |
| 2016/0321287 A1 | 11/2016 | Luthra et al. |
| 2016/0321288 A1 | 11/2016 | Malhotra et al. |
| 2016/0321291 A1 | 11/2016 | Malhotra et al. |
| 2016/0321311 A1 | 11/2016 | Tallamraju et al. |
| 2016/0323358 A1 | 11/2016 | Malhotra et al. |
| 2017/0134344 A1 | 5/2017 | Wu |
| 2017/0141921 A1 | 5/2017 | Berger |

OTHER PUBLICATIONS

Chiu, David, et al., "Elastic Cloud Caches for Accelerating Service-Oriented Computations", SC '10, New Orleans, LA, Nov. 13-19, 2010, 11 pages.*

Peng, Chunyi, et al., "VDN: Virtual Machine Image Distribution Network for Cloud Data Centers", INFOCOM 2012, Orlando, FL, Mar. 25-30, 2012, pp. 181-189.*

Zhou, Yuanyuan, et al., "Second-Level Buffer Cache Management", IEEE Transactions on Parallel and Distributed Systems, vol. 15, No. 6, Jun. 2004, pp. 505-519.*

Stefanov, Emil, et al., "Iris: A Scalable Cloud File System with Efficient Integrity Checks", ACSAC '12, Orlando, FL, Dec. 3-7, 2012, pp. 229-238.*

Saxena, Mohit, et al., "FlashTier: A Lightweight, Consistent and Durable Storage Cache", EuroSys '12, Bern, Switzerland, Apr. 10-13, 2012, pp. 267-280.*

Mancuso, Renato, et al., "Real-Time Cache Management Framework for Multi-core Architectures", RTAS 2013, Philadelphia, PA, Apr. 9-11, 2013, pp. 45-54.*

Haining, Theodore R., et al., "Management Policies for Non-Volatile Write Caches", PCCC 1999, Scottsdale, AZ, Feb. 12, 1999, pp. 321-328.*

Wang, Haiyang, et al., "On the Impact of Virtualization on Dropbox-like Cloud File Storage/Synchronization Services", IWQoS'12, Coimbra, Portugal, Jun. 4-5, 2012, Article No. 11, 9 pages.

Mao, Huajian, et al., "Wukong: A cloud-oriented file service for mobile Internet devices", Journal of Parallel and Distributed Computing, vol. 72, Issue 2, Feb. 2012, pp. 171-184.

Chun, Byung-Gon, et al., "CloneCloud: Elastic Execution between Mobile Device and Cloud", EuroSys '11, Salzburg, Austria, Apr. 10-13, 2011, pp. 301-314.

Notice of Allowance dated Mar. 14, 2018 for U.S. Appl. No. 15/140,248, 10 pages.

Non-Final Office Action dated Feb. 23, 2018 for U.S. Appl. No. 15/140,292, 12 pages.

Notice of Allowance dated Feb. 21, 2018 for U.S. Appl. No. 15/140,330, 19 pages.

Non-Final Office Action dated Apr. 18, 2018 for U.S. Appl. No. 15/140,310, 8 pages.

Apache Thrift Wikipedia, URL: https://en.wikipedia.org/wiki/Apache_Thrift, Oct. 27, 2015, 5 pages.

"REST Docs | Bitcasa Developer Center", URL: https://developer.bitcasa.com/docs/rest/, Sep. 2015, 188 pages.

"Data deduplication", Wikipedia, URL: https://en.wikipedia.org/wiki/Data_deduplication, Mar. 6, 2016, 7 pages.

Patroumpas, Kostas, et al., "Window Specification over Data Streams", EDBT 2006 Workshops, LNCS 4254, © IFIP International Federation for Information Processing© 2006, pp. 445-464.

Li, Jin, et al., "Semantics and Evaluation Techniques for Window Aggregates in Data Streams", ACM SIGMOD 2005, Baltimore, MD, Jun. 14-16, 2005, pp. 311-322.

Kim, Hyeon Gyu, et al., "Time-slide window join over data streams", Journal of Intelligent Information Streams, vol. 43, Issue 2, Oct. 2014, pp. 323-347.

Patroumpas, Kostas, et al., "Maintaining consistent results of continuous queries under diverse window specifications", Information Systems, vol. 36, Issue 1, Mar. 2011, pp. 42-61.

Li, Jin, et al., "AdaptWID: An Adaptive, Memory-Efficient Window Aggregation Implementation", IEEE Internet Computing, vol. 12, Issue 6, Nov.-Dec. 2008, pp. 22-29.

Notice of Allowance dated Jun. 15, 2018 for U.S. Appl. No. 15/140,179, 13 pages.

Final Office Action dated Aug. 1, 2018 for U.S. Appl. No. 15/140,292, 19 pages.

Notice of Allowance dated Sep. 6, 2018 for U.S. Appl. No. 15/140,310, 7 pages.

Office Action dated Nov. 9, 2018 for U.S. Appl. No. 15/140,357, 21 pages.

Final Office Action dated Feb. 6, 2019 for U.S. Appl. No. 15/140,357, 23 pages.

Non-Final Office Action dated Jun. 3, 2019 for U.S. Appl. No. 15/140,357, 20 pages.

Notice of Allowance dated Apr. 5, 2019 for U.S. Appl. No. 16/024,748, 29 pages.

Non-Final Office Action dated Jun. 13, 2019 for U.S. Appl. No. 15/140,292, 23 pages.

* cited by examiner

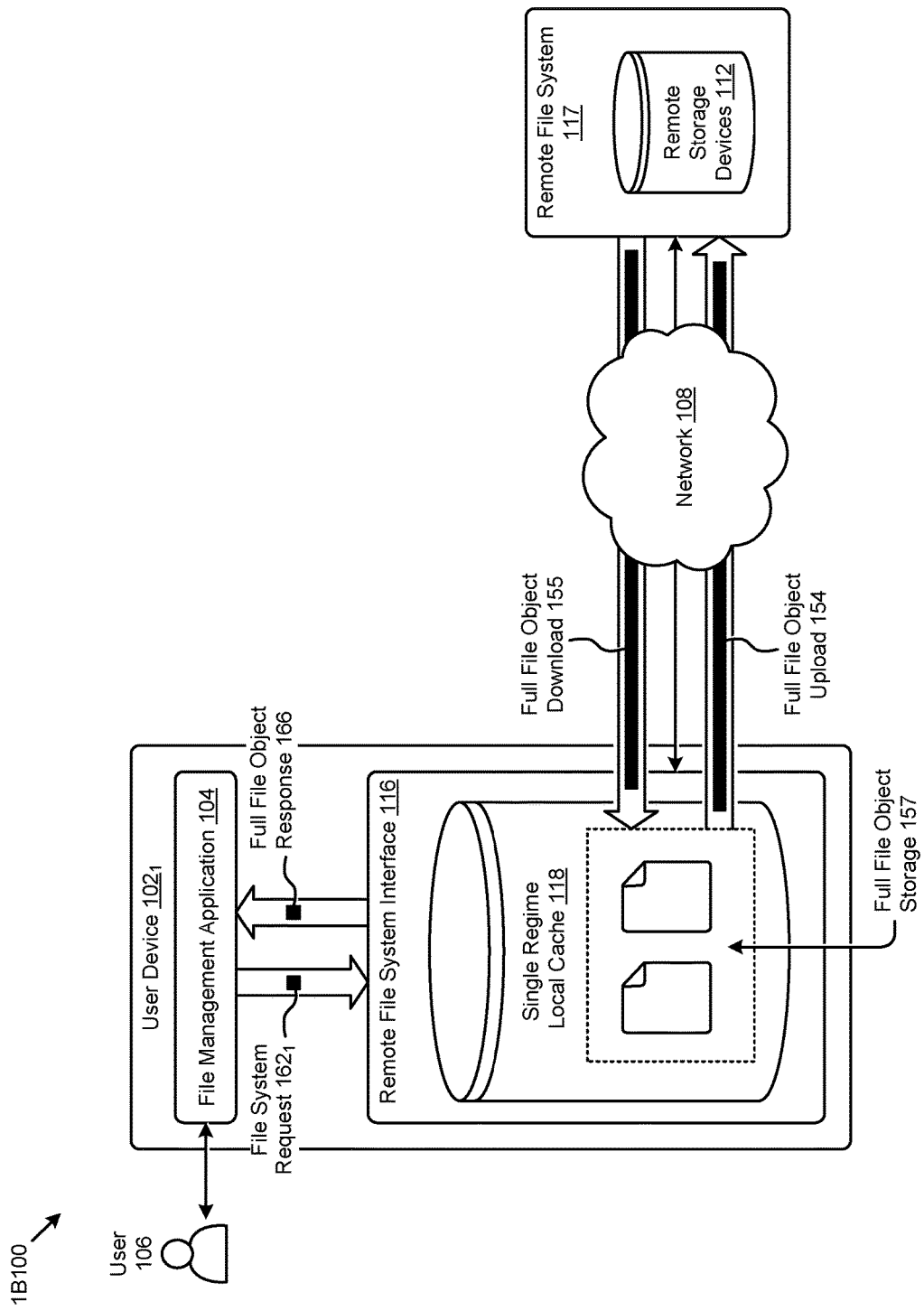
FIG. 1B1 (PRIOR ART)

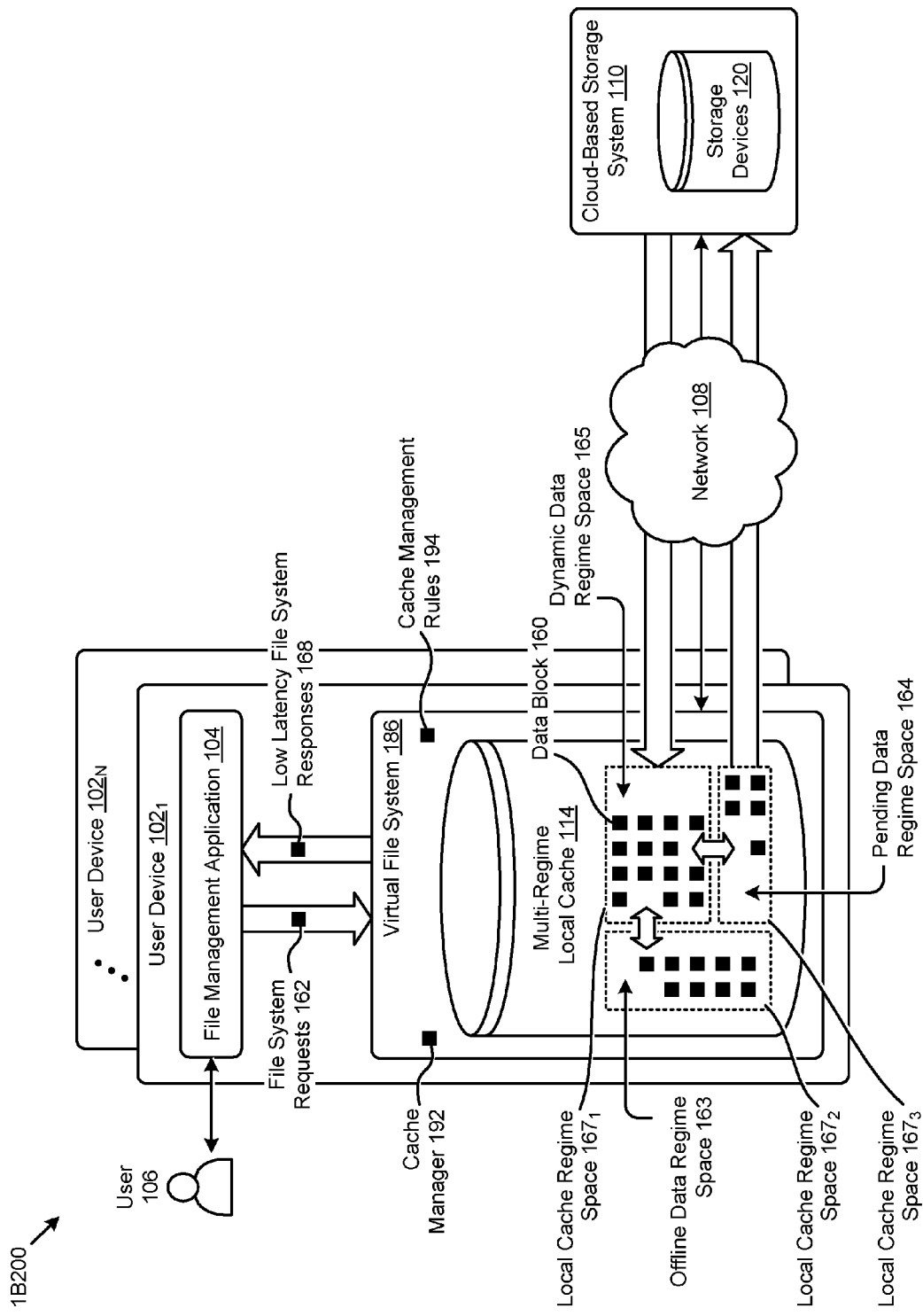
FIG. 1B2

MULTI-REGIME CACHING IN A VIRTUAL FILE SYSTEM FOR CLOUD-BASED SHARED CONTENT

RELATED APPLICATIONS

The present application claims the benefit of priority to co-pending U.S. Provisional Patent Application Ser. No. 62/154,658 titled, "METHOD MECHANISM TO IMPLEMENT A VIRTUAL FILE SYSTEM FROM REMOTE CLOUD STORAGE", filed Apr. 29, 2015, which is hereby incorporated by reference in its entirety.

The present application is related to co-pending U.S. Patent Application titled, "A VIRTUAL FILE SYSTEM FOR CLOUD-BASED SHARED CONTENT" filed on even date herewith; and the present application is related to co-pending U.S. Patent Application titled, "OPERATION MAPPING IN A VIRTUAL FILE SYSTEM FOR CLOUD-BASED SHARED CONTENT" filed on even date herewith; and the present application is related to co-pending U.S. Patent Application titled, "FILE TREE STREAMING IN A VIRTUAL FILE SYSTEM FOR CLOUD-BASED SHARED CONTENT" filed on even date herewith; and the present application is related to co-pending U.S. Patent Application titled, "FILE-AGNOSTIC DATA DOWNLOADING IN A VIRTUAL FILE SYSTEM FOR CLOUD-BASED SHARED CONTENT" filed on even date herewith; and the present application is related to co-pending U.S. Patent Application titled, "SECURE CLOUD-BASED SHARED CONTENT" filed on even date herewith; all of which are hereby incorporated by reference in their entirety.

FIELD

This disclosure relates to managing content in a cloud-based service platform, and more particularly to techniques for rules-based multi-regime caching in a virtual file system in a highly collaborative cloud-based environment.

BACKGROUND

The proliferation of cloud-based services and platforms continues to increase. Specifically, cloud-based content management services and platforms have impacted the way personal and corporate electronically stored information objects (e.g., files, images, videos, etc.) are stored, and has also impacted the way such personal and corporate content is shared and managed. One benefit of using such cloud-based platforms is the ability to securely share large volumes of content among trusted collaborators on a variety of user devices such as mobile phones, tablets, laptop computers, desktop computers, and/or other devices. For example, a large enterprise with thousands of users (e.g., employees) and many terabytes of content might use a cloud-based content storage platform to efficiently and securely facilitate content access to various individual users and/or collaborative groups of users. In such cases, a user can access a large volume of objects stored in the cloud-based platform from a user device that might store merely a small portion of that volume locally. Such access can enable multiple users (e.g., collaborators) to manage certain shared objects for various collaborative purposes (e.g., co-development, audience presentation, etc.). Specifically, users can manage (e.g., create, view, edit, execute, etc.) the shared objects using various applications operating on a user device.

For example, multiple users might collaborate on the development of a certain design document using a respective instance of an application operating on a respective user device. In such cases, some of the users might collaborate by concurrently managing (e.g., viewing, editing, etc.) the design document on their user devices in an online mode or an offline mode. Such local shared object access might require certain synchronization and/or conflict remediation operations to occur to facilitate the collaboration. In some cases, such collaborative documents and/or other objects stored in the cloud-based content storage platform can be large.

Unfortunately, legacy techniques for facilitating collaboration on cloud-based shared content objects on a local user device can be limited at least as pertaining to local access latencies and/or synchronization associated with the shared content objects. Specifically, certain legacy approaches might allocate a local cache on the user device to store certain content objects (e.g., currently managed objects, recently accessed objects) for improved access latencies for such objects. For large content objects (e.g., a 500-page design document with pictures), while the user might desire to merely access a small portion of the document, such legacy approaches might completely fill the local cache with the full document (e.g., all of the words and all of the pictures). In such cases, the user might experience a long latency. Further, legacy cache allocation and/or management approaches are inefficient in facilitating the synchronization and/or conflict remediation aspects of a highly collaborative, shared content environment. Specifically, for example, such legacy approaches are limited as pertaining to cache allocation and/or cache management capabilities vis-à-vis the various content states (e.g., online, offline, updated, etc.) associated with such highly collaborative shared content environments.

What is needed is a technique or techniques to improve over legacy and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for rules-based multi-regime caching in a virtual file system in a highly collaborative cloud-based environment, which techniques advance the relevant technologies to address technological issues with legacy approaches. More specifically, the present disclosure provides a detailed description of techniques used in systems, methods, and in computer program products for rules-based multi-regime caching in a virtual file system in a highly collaborative cloud-based environment. Certain embodiments are directed to technological solutions for implementing a virtual file system (VFS) on a local device to facilitate rules-based multi-regime local caching of shared content objects from a cloud-based storage system, which embodiments advance the relevant technical fields as well as advancing peripheral technical fields. The disclosed embodiments modify and improve over legacy approaches. In particular, the herein-disclosed techniques provide technical solutions that address the technical problems attendant to low latency local access to shared content objects stored on a highly collaborative cloud-based storage system.

Such technical solutions serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments provide advances in the technical field of high-performance computing as well as advances in various technical fields related to distributed storage.

Further details of aspects, objectives, and advantages of the technological embodiments are described herein and in the following descriptions, drawings and claims.

BRIEF DESCRIPTION OF THE DRAWINGS

The drawings described below are for illustration purposes only. The drawings are not intended to limit the scope of the present disclosure.

FIG. 1B1 presents a single regime caching technique.

FIG. 1B2 presents a multi-regime caching technique as used in conjunction with a virtual file system in a highly collaborative cloud-based environment, according to some embodiments.

FIG. 2 is an interconnection diagram showing communications between system components in a virtual file system, according to an embodiment

DETAILED DESCRIPTION

Figure 1A:
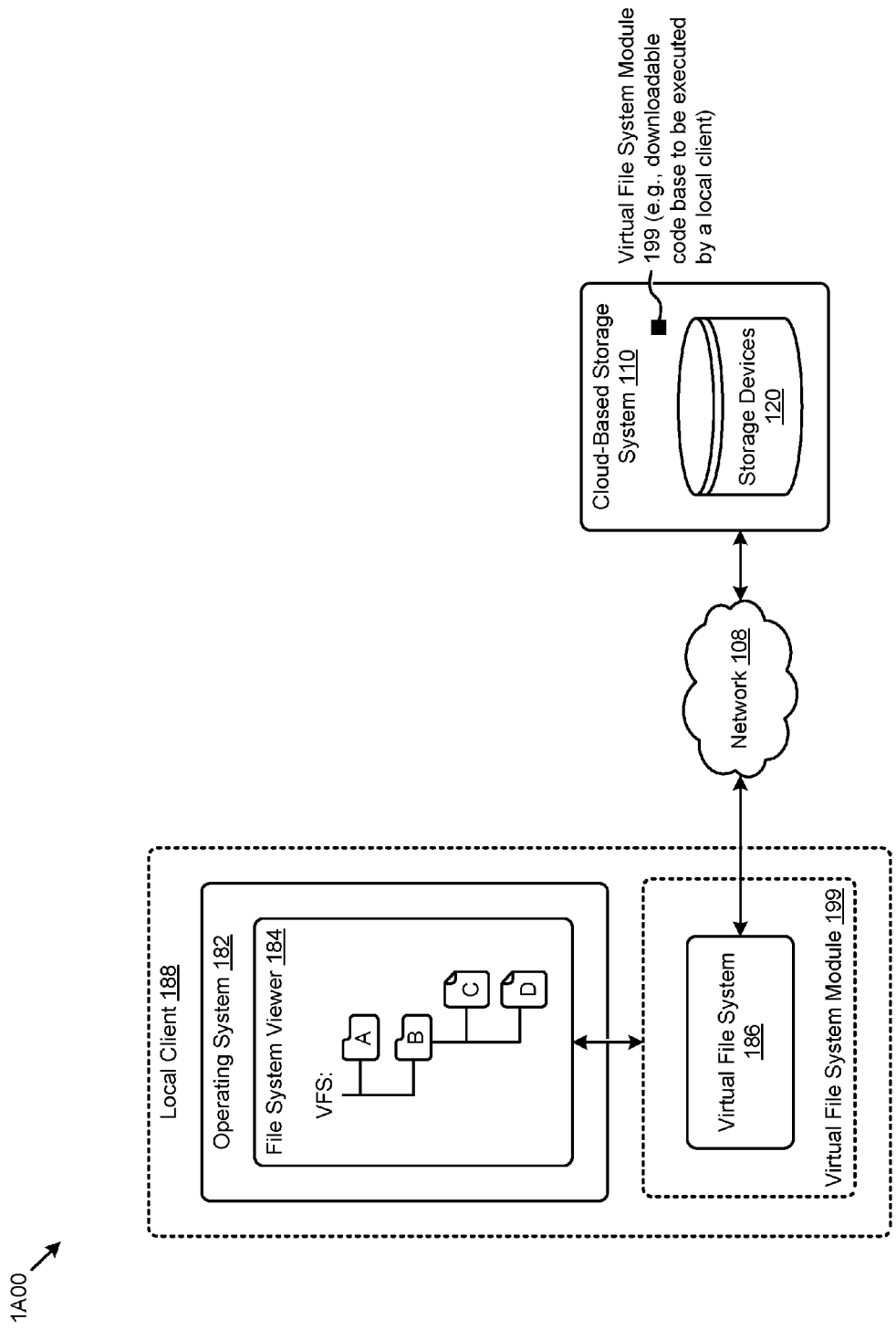
FIG. 1A illustrates a logical system view of a virtual file system for cloud-based shared content, according to some embodiments.

Some embodiments of the present disclosure address the problem of low latency local access to shared content objects stored on a highly collaborative cloud-based storage system and some embodiments are directed to approaches for implementing a virtual file system (VFS) on a local device to facilitate rules-based multi-regime local caching of shared content objects from a cloud-based storage system. The accompanying figures and discussions herein present example environments, systems, methods, and computer program products.

Overview

Disclosed herein are techniques that implement a virtual file system (VFS) on a local device to facilitate rules-based multi-regime local caching of shared content objects from a cloud-based storage system. Specifically, in some embodiments, a cache manager in the VFS can dynamically allocate space to multiple local cache regimes to hold multiple respective sets of data blocks to facilitate low latency local access. Techniques further facilitate efficient local storage capacity usage, and efficient collaborative shared content synchronization, as well as other capabilities. Specifically, in some embodiments, the cache manager might allocate a dynamic data regime space, an offline data regime space (e.g., to facilitate offline content access), and/or a pending data regime space (e.g., to facilitate cloud synchronization). In certain embodiments, the cache manager can monitor file system requests to invoke certain cache management operations (e.g., cache space allocation, regime data storage, cache data eviction, etc.) based at least in part on various cache management rules. In some embodiments, certain cache management rule parameters pertaining to the data blocks and/or to the cache regimes can be applied to the cache management rules to generate a set of cache access response directives that serve to direct cache management operations pertaining to the movement of data blocks to and/or from cache regimes when a cache access is granted and/or when a data operation to be performed over the cache is initiated. In certain embodiments, the cache access response directives can be refreshed by the cache manager responsive to detected file system requests and/or responsive to a timeout indicator.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXAMPLE EMBODIMENTS

FIG. 1A illustrates a logical system view 1A00 of a virtual file system for cloud-based shared content. As an option, one or more variations of logical system view 1A00 or any aspect thereof may be implemented in the context of the architecture and functionality of the embodiments described herein. The logical system view 1A00 or any aspect thereof may be implemented in any environment.

As shown, the logical system view 1A00 comprises a local client 188 such as a user device (e.g., smart phone, laptop, etc.) that can have an operating system 182 that supports the operation of various applications such as a file system viewer 184. In some cases, the file system viewer 184 might comprise a portion of a given application (e.g., an explorer to open an application file). As shown, the file system viewer 184 might render a visual representation of the certain objects such as directories (e.g., folder A, folder B, etc.) and/or files (e.g., file C, file D, etc.), accessible at the local client 188. However, some or all of the objects (e.g., directories, files, etc.) accessible and/or visible within the file system viewer 184 might not be managed by the operating system 182. In some cases, the primary storage for such objects might be implemented across a network 108 by a cloud-based storage system 110.

For example, certain instances of the cloud-based storage system 110 can be embodied as a cloud-based and/or SaaS-based storage management architecture having one or more instances of storage devices 120. The storage devices 120 can comprise any combination of hardware and software that can provide access to the data (e.g., content, objects, etc.) stored on the storage devices 120. For example, the storage devices 120 might be implemented as computer memory operatively managed by an operating system (OS), hard disk drives, solid-state drives, networked attached storage, storage area networks, cloud-based storage, and/or any other type of storage facility and/or architecture that is capable of storing data. The data in the storage devices 120 can be implemented as any type of data objects and/or files.

One advantage of the cloud-based storage system 110 serving as the primary storage for certain objects accessible by the local client 188 can be the capability of the cloud-based storage system 110 to facilitate storage functionality as a service on a hosted platform. In such cases, each instance of the local client 188 (e.g., a user device associated with a user) that needs the service does not need to install and configure a respective instance of the cloud-based storage service components on a network (e.g., intranet) comprising the instance of the local client 188. Further, the host environment of the cloud-based storage system 110 can provide storage services to multiple users and/or scale to service any number of users.

According to the herein disclosed techniques, a virtual file system 186 can be delivered to the local client 188 to facilitate access to objects stored at the cloud-based storage system 110. In some embodiments, the virtual file system 186 can be implemented as a virtual file system module 199. As described herein, the virtual file system 186 can address the problems attendant to low latency local access (e.g., at the local client 188) to and/or synchronization with shared content objects stored on a highly collaborative cloud-based storage system such as the cloud-based storage system 110. As an example, the virtual file system 186 implementing the herein disclosed techniques can facilitate rules-based multi-regime local caching of shared content objects from the cloud-based storage system 110.

In some cases, however, legacy approaches that might use a local cache and/or other techniques for facilitating collaboration on cloud-based shared content objects on a local user device can be limited at least as pertaining to local access latencies and/or synchronization associated with the shared content objects. One example of such legacy approaches is described in FIG. 1B1.

FIG. 1B1 presents a single regime caching technique 1B 100. As an option, one or more variations of single regime caching technique 1B 100 or any aspect thereof may be implemented in the context of the architecture and functionality of the embodiments described herein. The single regime caching technique 1B100 or any aspect thereof may be implemented in any environment.

The single regime caching technique 1B 100 illustrates certain problems with legacy approaches attendant to low latency local access to and/or synchronization with shared content objects stored on a highly collaborative cloud-based storage system. Specifically, as shown, a remote file system interface 116 can be provided to a user device $102_1$ operated by a user 106 to facilitate access to a remote file system 117 over the network 108. More specifically, a file management application 104 can interact with the remote file system interface 116 to request access to various objects (e.g., files) stored in the remote storage devices 112 at the remote file system 117. According to some legacy techniques, a single regime local cache 118 can be allocated in the local memory space of the user device $102_1$ to facilitate processing of certain local operations (e.g., viewing, editing, etc.) on the files by the file management application 104. The single regime local cache 118 can be characterized as merely having one set of conditions (e.g., one purpose) under which it operates and/or is managed.

Specifically, as shown, the single regime local cache 118 can be managed to facilitate a full file object storage 157. In this case, for example, a file system request 162₁ from the file management application 104 to the remote file system interface 116 might invoke a full file object download 155 of the requested file from the remote file system 117 to the single regime local cache 118. In such cases, a full file object response 166 might be presented to the file management application 104 when the user 106 merely desires to view a small portion of the requested file. Such full file object downloads and/or responses can result in an inefficient use of the limited local memory space available to be allocated to the single regime local cache 118 on the user device 102₁. Storing full files in the single regime local cache 118 can also limit the low latency local access available to the file management application 104 and/or other applications operating on the user device 102₁ to merely a few files. For example, if the user 106 requests a 1 GB file, and the single regime local cache 118 has 0.9 GB space available, the user 106 cannot access the requested file until sufficient space is allocated in the single regime local cache 118 and an instance of the full file object download 155 is completed. Such long latencies associated with instances of the full file object download 155 can be detrimental to the experience of the user 106.

The full file object storage 157 in a single regime local cache 118 associated with some legacy approaches can also be inefficient in facilitating the synchronization and/or conflict remediation aspects of a highly collaborative, shared content environment. Specifically, a modified file in the single regime local cache 118 might be committed to the remote file system 117 using a full file object upload 154 when merely a small portion of the modified file was updated. Such legacy approaches inefficiently use the local memory space and/or network bandwidth pertaining to locally modified data pending remote storage commitment by storing the full file in the single regime local cache 118. Such approaches incur long latencies associated with the full file object upload 154, during which multiple collaboration conflicts might occur (e.g., in a highly collaborative shared content environment). The full file object storage 157 of the single regime local cache 118 can be replaced or augmented to allow the user 106 to mark certain files and/or data for other purposes such as offline access.

Replacements and/or extensions to the foregoing approaches can be implemented by use of the herein disclosed techniques for rules-based multi-regime caching in a virtual file system.

Figure 2:
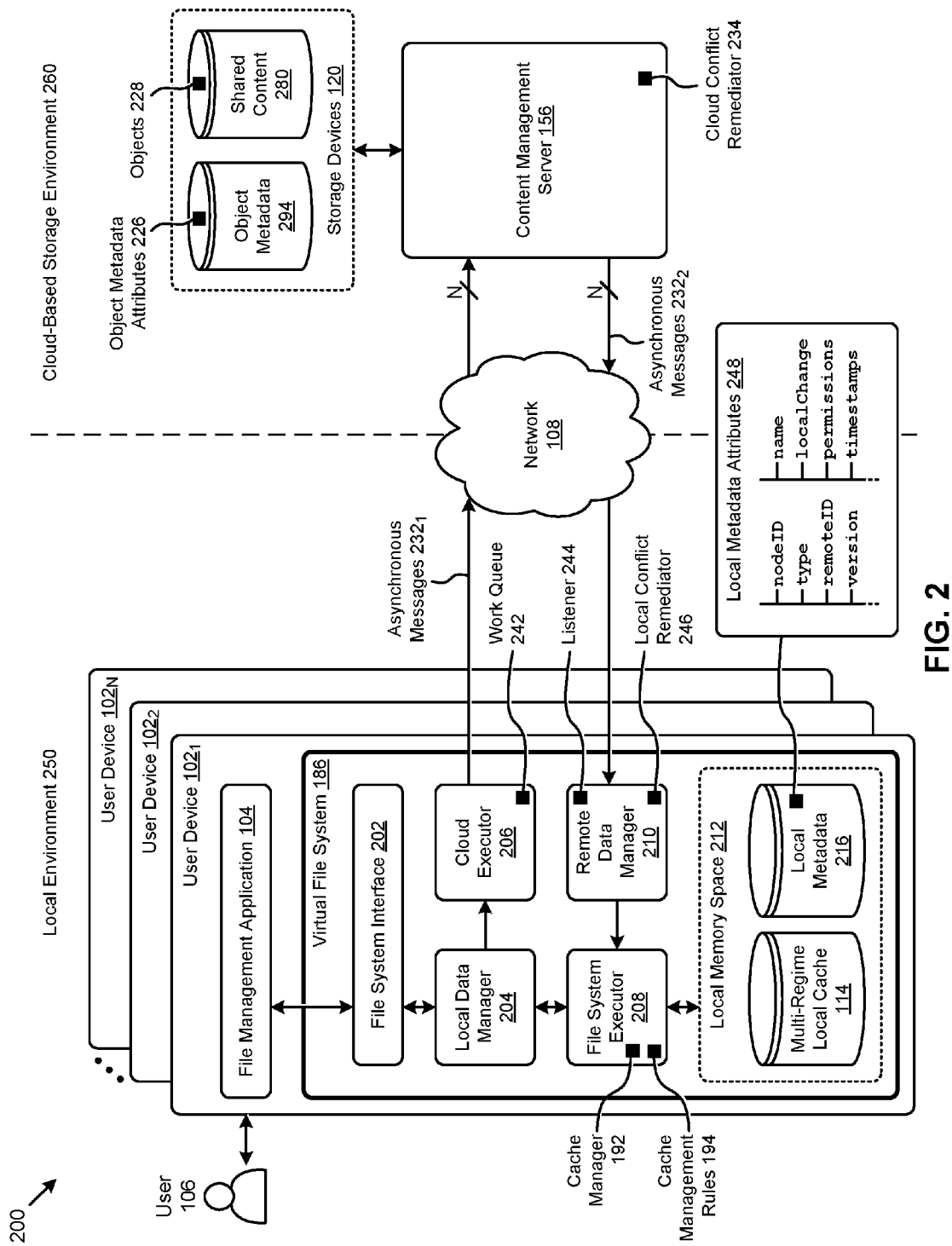

FIG. 1B2 presents a multi-regime caching technique 1B200 as used in conjunction with a virtual file system in a highly collaborative cloud-based environment. As an option, one or more variations of multi-regime caching technique 1B200 or any aspect thereof may be implemented in the context of the architecture and functionality of the embodiments described herein. The multi-regime caching technique 1B200 or any aspect thereof may be implemented in any environment.

The multi-regime caching technique 1B200 depicts a technique enabled by the herein disclosed techniques for rules-based multi-regime local device caching of shared content from a highly collaborative cloud-based environment. Specifically, in one or more embodiments, instances of a virtual file system module (e.g., virtual file system 186, etc.) can be delivered to various user devices (e.g., user device 102₁, . . . , user device 102ₙ) associated with respective users, such as user 106, to provide a set of low latency file system responses 168 to a set of file system requests 162 from one or more applications represented by the file management application 104. For example, the virtual file system 186 might receive various instances of the file system requests 162 issued from the file management application 104 to access certain objects (e.g., requested files) stored in the storage devices 120 of the cloud-based storage system 110. In some embodiments, a cache manager 192 and a set of cache management rules 194 at the virtual file system 186 can monitor the file system requests 162 to facilitate management of a multi-regime local cache 114 at the user device 102₁. Specifically, the multi-regime local cache 114 can comprise multiple instances of local cache regime spaces allocated in the local memory space (e.g., single storage drive) of the user device 102₁.

Each individual allocation of a local cache regime space (e.g., local cache regime space 167₁, local cache regime space 167₂, local cache regime space 167₃) can be independently managed by the cache manager 192 under a certain set of conditions and/or for a certain purpose. More specifically, in some embodiments, the multi-regime local cache 114 can comprise a dynamic data regime space 165, a pending data regime space 164, an offline data regime space 163, and/or other regime spaces. The dynamic data regime space 165, for example, might comprise data currently accessed by the file management application 104. The dynamic data regime space 165 might further comprise data recently accessed and/or expected to be accessed to facilitate a low latency access to data requested by the user 106 at a later moment in time. The pending data regime space 164, as another example, might comprise a set of data that has been modified locally (e.g., at the file management application 104) but has not been committed at the cloud-based storage system 110. The offline data regime space 163 might comprise data that is marked for offline access when, for example, the user device 102₁ is disconnected from the network 108 and/or the cloud-based storage system 110. The pending data regime space 164 and/or the offline data regime space 163 can be used facilitate certain aspects (e.g., synchronization, conflict remediation, online and offline collaboration, etc.) pertaining to a highly collaborative cloud-based storage system. In exemplary cases, the offline data regime space 163 is allocated from one or more forms of persistent storage (e.g., hard disk drives, solid-state drives, or any other type of storage device that is capable of retaining stored data even after the device is turned off).

Further, in certain embodiments, the data in the local cache regime spaces can comprise one or more data blocks (e.g., data block 160) corresponding to a portion of a requested file. For example, the data blocks in the dynamic data regime space 165 might merely comprise the portion of the requested file that can be viewed at a given moment in time in the file management application 104. Such an approach as facilitated by the herein disclosed techniques improves the utilization efficiency of the local memory space. In some cases, the cache manager 192 can dynamically evict certain data blocks from one or more local cache regime spaces to establish a free space for other data blocks to be added to the local cache regime spaces. In some embodiments, a page table might be implemented comprising pointers to respective data blocks and/or chunks. Such chunks can represent individually addressable portions of the files. In some cases, for example, the chunks can be implemented as fixed-sized chunks. In such cases, if user 106 requests access to chunks at addr1 and addr6, then merely the chunks at addr1 and addr6 can be downloaded to the multi-regime local cache 114.

One embodiment of a system for implementing the foregoing and herein disclosed techniques for rules-based multi-regime caching in a virtual file system for cloud-based shared content is described as pertaining to FIG. 2.

FIG. 2 is an interconnection diagram 200 showing communications between system components in a virtual file system. As an option, one or more variations of interconnection diagram 200 or any aspect thereof may be implemented in the context of the architecture and functionality of the embodiments described herein. The interconnection diagram 200 or any aspect thereof may be implemented in any environment.

FIG. 2 presents various system components in a local environment 250 and a cloud-based storage environment 260 that can be used to implement a virtual file system according to the herein disclosed techniques. Specifically, each instance of various user devices (e.g., user device $102_1$, user device $102_2$, . . . , user device $102_N$) can run certain applications that can interface with a local instance of the virtual file system. More specifically, the user device $102_1$ operated by the user 106 is shown running a file management application 104 that interacts with the virtual file system 186. According to some embodiments, the virtual file system 186 can comprise a file system interface 202, a local data manager 204, a cloud executor 206, a file system executor 208, a remote data manager 210, and a local memory space 212. As shown, the local memory space 212 can comprise the multi-regime local cache 114 and a set of local metadata 216. For example, the multi-regime local cache 114 might comprise one or more partitions of the local memory space 212 of the user device $102_1$. Further, the local metadata 216 can comprise internal data structures for fast access. In some cases, such internal data structures can be protected (e.g., locked).

Further, data structures for the local metadata 216 can hold a set of local metadata attributes 248, as shown. For example, the local metadata attributes 248 for each object accessible by the virtual file system 186 might include a nodeID uniquely identifying a certain node in a file tree associated with the object, a type attribute describing the node and/or object type (e.g., folder, file, etc.), a remoteID uniquely identifying the object in the cloud-based storage environment 260, a version attribute describing the version of the object (e.g., from the perspective of the local environment 250), a name for the object, a localChange bit indicating a local change (e.g., bit=1) that has yet to be confirmed at the cloud-based storage environment 260, a set of permissions for the object (e.g., full access, view-only, unlocked, locked, etc.), one or more timestamps to indicate various events (e.g., last accessed, last modified, created, etc.), and/or other attributes. In some cases, the localChange bit might indicate that a local change has occurred merely for a short time, since it can be cleared (e.g., bit=0) when confirmation that a change was committed remotely has been received by the virtual file system 186. In other cases, the local metadata 216 can be specific to the operating system (OS) of the user device. For example, the structure and/or attributes associated with the local metadata 216 might be established at compile time of the virtual file system 186 based at least in part on a target OS. As a specific example for Mac OS, the local metadata attributes 248 might further include xattr extended attributes, a UID user identifier, and/or a groupID group identifier.

As shown in the cloud-based storage environment 260, a content management server 156 can represent the various computing devices that carry out the operations of a cloud-based shared content storage platform (e.g., cloud-based storage system 110 earlier described). The content management server 156 can interface with the storage devices 120 that can comprise a set of shared content 280, a set of object metadata 294, and/or other data to facilitate the cloud-based storage operations. As shown, the object metadata 294 can comprise certain instances of object metadata attributes 226 that characterize the objects 228 stored in the cloud-based storage platform. For example, the object metadata attributes 226 might include certain attributes that characterize the location, version, permissions, access rules, and/or other characteristics of a given object. Further, the shared content 280 can store the objects 228 comprising the underlying data accessed by the various user devices in the local environment 250 using the herein disclosed techniques.

Specifically, the herein disclosed techniques can manage the structure and/or contents of the multi-regime local cache 114 to facilitate a low latency access to and/or synchronization with the large volumes of shared content 280 in the cloud-based storage environment 260 on a user device having a limited local storage capacity in the local environment 250. For example, the user 106 of the user device $102_1$ might belong to an enterprise that owns large volumes of shared enterprise content that the user might need to access. However, the user device $102_1$ might only be able to store a small portion of the shared enterprise content. Access to such large volumes of shared content stored on a remote cloud-based storage platform by multiple collaborators using resource-limited (e.g., memory-limited) local user devices can be facilitated by the embodiment of the herein disclosed virtual file system shown in FIG. 2.

Specifically, the user 106 of the user device $102_1$ might invoke various file system operations from the file management application 104 that are received by the file system interface 202 of the virtual file system 186. The file system interface 202 can interpret the file system calls (e.g., in an application-specific and/or OS-specific structure) for dispatch to the local data manager 204 in a structure common (e.g., platform-agnostic, OS-agnostic) to the virtual file system 186. In response to the dispatched call from the file system interface 202, the local data manager 204 can issue one or more commands and/or calls to the file system executor 208 and/or the cloud executor 206. For example, the file system executor 208 might process commands for the local environment 250, while the cloud executor 206 might process commands for the cloud-based storage environment 260.

Specifically, the file system executor 208 can process commands and/or calls associated with the local memory space 212 such as a change to the local metadata 216 and/or a change to the multi-regime local cache 114. For example, an edit to a portion (e.g., chunk, data block, etc.) of an object using the file management application 104 might invoke a call to the file system executor 208 to change various metadata attributes (e.g., version, size, last modified timestamp, etc.) in the local metadata 216 and/or change portions of the multi-regime local cache 114 corresponding to the modified object chunk. In some cases, such operations by the file system executor 208 are invoked synchronously in response to the originating file system call dispatched from the file system interface 202. In some embodiments, the cache manager 192 and/or the cache management rules 194 might be implemented in the file system executor 208 to monitor certain calls (e.g., file system requests) and/or other information (e.g., space usage in the multi-regime local cache 114) to facilitate the various techniques disclosed herein (e.g., rules-based multi-regime caching).

Further, the cloud executor 206 can receive calls from the local data manager 204 into a work queue 242 for asynchronous delivery (e.g., see asynchronous messages $232_1$) to the content management server 156 through the network 108. For example, the foregoing edit to a portion of an object using the file management application 104 might also invoke a call to the cloud executor 206 to change various object metadata attributes (e.g., version, size, last modified timestamp, etc.) in the object metadata 294 and/or change portions of the shared content 280 corresponding to the modified object portion. Such operations can be issued from the work queue 242 as an instance of the asynchronous messages $232_1$. As shown, the content management server 156 can receive such asynchronous messages from any and all (e.g., N) user devices of various collaborators.

A cloud conflict remediator 234 at the content management server 156 can reconcile the information (e.g., versions, object changes, etc.) received from the local environment 250 and can deliver (e.g., emit a message, broadcast messages) the reconciled information to the N user devices of the collaborators in a set of asynchronous messages $232_2$. For example, the asynchronous messages $232_2$ might include metadata updates and/or object updates. Such asynchronous updates can be received locally by a listener 244 at the remote data manager 210. The remote data manager 210 can schedule the received changes with the file system executor 208 to be applied to the local memory space 212. In some cases, a local conflict remediator 246 at the remote data manager 210 might reconcile certain local conflicts (e.g., among various local online and/or offline versions and remote versions). The foregoing approach facilitates use models where each collaborator can work asynchronously (e.g., independently) on various shared content, yet experience low latency (e.g., near real time) updates pertaining to operations performed by other collaborators in a respective instance of the local environment 250. The foregoing synchronization capabilities can be used by cloud-based storage environments that support multi-tenant resource sharing arrangements.

The system components of FIG. 2 present merely one partitioning. The specific example shown is purely exemplary, and other partitioning is reasonable. One embodiment of an implementation of the herein disclosed techniques comprising certain components from the system components of FIG. 2 is shown in FIG. 3.

Figure 3:
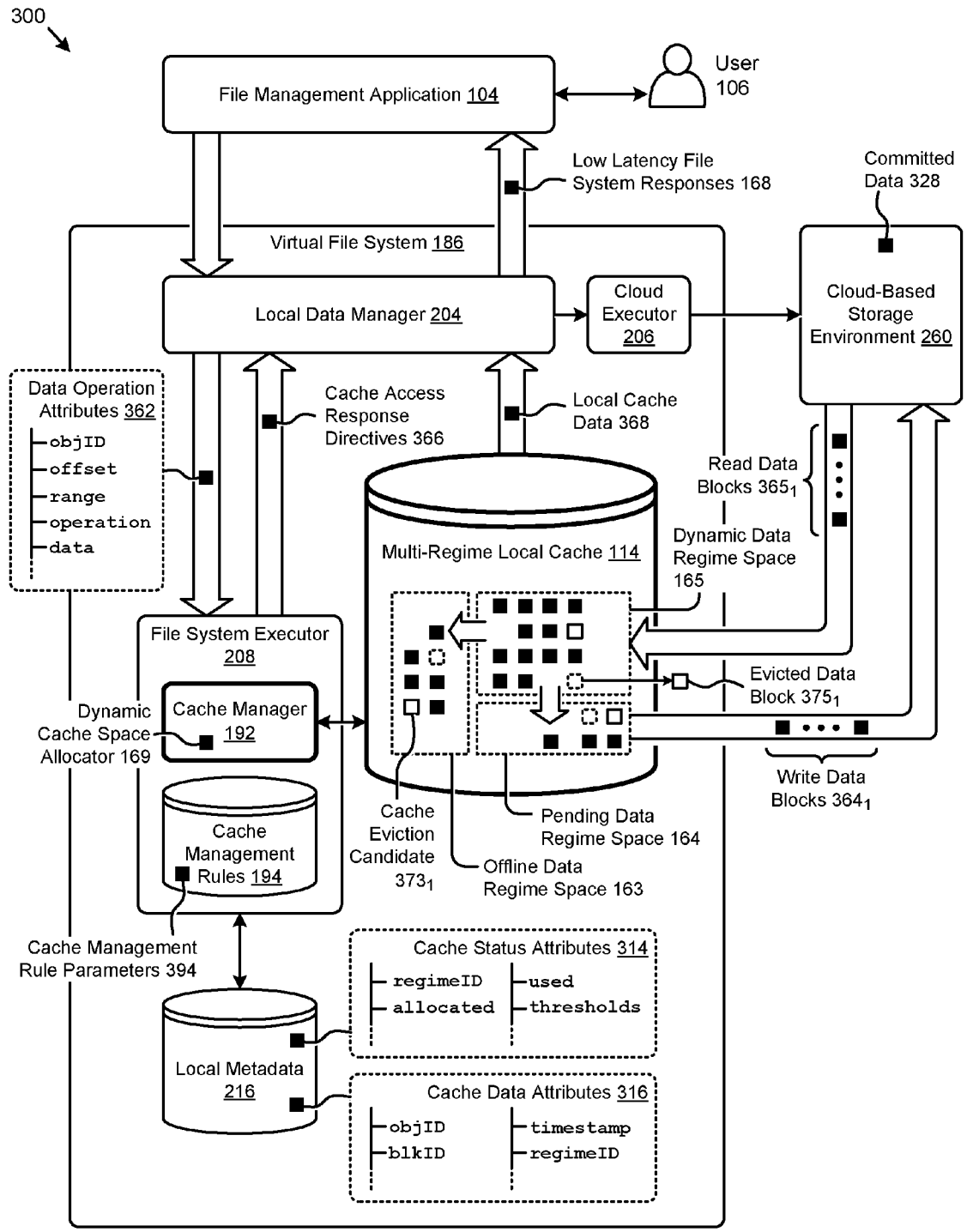
FIG. 3 is a block diagram showing interactions between system components that cooperate to implement rules-based multi-regime caching in a virtual file system, according to an embodiment.

FIG. 3 is a block diagram 300 showing interactions between system components that cooperate to implement rules-based multi-regime caching in a virtual file system. As an option, one or more variations of block diagram 300 or any aspect thereof may be implemented in the context of the architecture and functionality of the embodiments described herein. The block diagram 300 or any aspect thereof may be implemented in any environment.

The embodiment of FIG. 3 shows a logical view of certain components, interconnects, and/or data flows of the virtual file system 186 to implement the herein disclosed techniques for rules-based multi-regime caching in a highly collaborative cloud-based environment. Specifically, in some embodiments, the cache manager 192 in the file system executor 208 of the virtual file system 186 can (e.g., using the shown dynamic cache space allocator 169) dynamically allocate various instances of local cache regime spaces in the multi-regime local cache 114 to hold respective sets of data blocks to facilitate low latency local access, efficient local storage capacity usage, collaborative shared content synchronization, as well as other capabilities. Specifically, as shown, the cache manager 192 might allocate the dynamic data regime space 165, the offline data regime space 163, and/or the pending data regime space 164 in the multi-regime local cache 114. In certain embodiments, the cache manager 192 can also monitor the file system requests 162 to invoke certain cache management operations (e.g., local cache regime space allocation, local cache regime data content management, cache data eviction, etc.) based at least in part on results derived from one or more of the cache management rules 194. Further, certain instances of cache management rule parameters 394 pertaining to the file system requests 162 and/or the data and/or structure of the multi-regime local cache 114 can be applied to the cache management rules 194 to generate a set of cache access response directives 366 for directing the cache management operations and/or other operations performed by the virtual file system 186. In certain embodiments, the cache management rules 194 can comprise rules and/or logic configured to specifically address certain characteristics pertaining to virtual file systems in highly collaborative cloud-based storage environments. The cache management rules 194 can comprise paradigms, philosophies, and/or logic associated with cache management algorithms (e.g., least recently used or LRU, most recently used or MRU, pseudo-LRU, random replacement, segmented LRU, etc.).

More specifically, in certain embodiments, one or more of the file system requests 162 can be received at the local data manager 204 of the virtual file system 186. For example, the file system requests 162 might pertain to a requested file stored in the cloud-based storage environment 260. The file system requests 162 can be issued from the file management application 104 associated with the user 106. In some cases, the file system requests 162 can be parsed and/or transformed by the local data manager 204 and/or other components of the virtual file system 186 to present a set of data operation attributes 362 to the cache manager 192 at the file system executor 208. For example, the data operation attributes 362 might comprise an objID attribute describing an object identifier associated with the file (e.g., requested file) associated with a file system request, an offset attribute identifying a data memory location offset pertaining to the file system request, a range attribute describing a data memory range pertaining to the file system request, an operation attribute characterizing the operation (e.g., read, write, move, metadata update, etc.) associated with the file system request, a data attribute comprising a data payload associated with the operation, and/or other attributes.

The cache manager 192 might further collect certain information pertaining to the multi-regime local cache 114. In some embodiments, the local metadata 216 managed by the virtual file system 186 can store such information associated with the multi-regime local cache 114. Specifically, for example, the local metadata 216 might include a set of cache status attributes 314 characterizing the status of the multi-regime local cache 114 and/or a set of cache data attributes 316 characterizing the data stored in the multi-regime local cache 114. For example, the cache status attributes 314 might comprise a local cache regime space identifier or regimeID attribute identifying a particular local cache regime space, an allocated attribute describing an allocated cache regime space value for the identified cache regime, a used attribute describing a used cache regime space value for the identified cache regime, a thresholds attribute characterizing one or more threshold values (e.g., maximum size, minimum size, amount used warning, etc.) pertaining to the identified cache regime, and/or other attributes. Also, for example, the cache data attributes 316 might comprise an object identifier or objID attribute identifying an object associated with a particular portion of data (e.g., data block, chunk, file, etc.) in a cache regime space, a data block identifier or blkID attribute identifying a data block, a timestamp attribute characterizing one or more moments in time (e.g., last access, last modified, created, etc.) associated with the data, a local cache regime space identifier or regimeID attribute characterizing the local cache regime space associated with the data, and/or other attributes.

Any of the data operation attributes 362, the cache status attributes 314, the cache data attributes 316, and/or other information can be used to derive the cache management rule parameters 394 that can be applied to the cache management rules 194 to determine the cache access response directives 366. For example, the data operation attributes 362 received by the cache manager 192 might indicate that a certain set of data blocks are requested for immediate access by the file management application 104. The cache data attributes 316 accessible by the cache manager 192 might further indicate that some of the requested data blocks exist in the dynamic data regime space 165 of the multi-regime local cache 114. Further, the cache status attributes 314 might be applied to the cache management rules 194 to determine if there is enough free space in the dynamic data regime space 165 to receive the remainder of the requested data blocks, to determine if the dynamic data regime space 165 and/or any other local cache regime space might be restructured, and/or if any other cache management operations are to be performed.

As an example, the cache manager 192 might then issue a set of cache access response directives 366 to the local data manager 204 indicating that a set of local cache data 368 can be accessed for the portion of the requested data blocks, and that a set of read data items (e.g., read data blocks $365_1$) comprising the remainder of the requested data blocks can be downloaded from the cloud-based storage environment 260 using the cloud executor 206. The read data items can be modified by the user, and upon doing so, the cache manager 192 might evict the now modified read data item by moving it to a different regime space.

At any moment in time, the cache manager 192 might undertake operations to evict certain data from the multi-regime local cache 114 so as to generate free space for the read data blocks $365_1$. Specifically, the cache manager 192 might select an evicted data block $375_1$ from one or more cache eviction candidates (e.g., cache eviction candidate $373_1$) to evict from the multi-regime local cache 114. In some cases, such cache evictions might comprise a modification to certain instances of the cache data attributes 316 in the local metadata 216. Further, the cache eviction candidates can be determined at least in part by using the cache management rules 194. For example, a first cache management rule (e.g., for read, but not modified data) might be applied to evict on a least-recently used basis, while a second cache management rule (e.g., for data items that have been modified by the virtual file system) might be an evict only after commit rule that allows a data item to be evicted only after receiving a successful write operation confirmation (e.g., of committed data) from the cloud-based storage environment. Separately allocated cache segments, each using different types of memory (e.g., volatile memory and non-volatile memory) can also have respective cache management rules that differ. As another example, the timestamp attribute in the cache data attributes 316 might be applied to certain instances of the cache management rules 194 to determine the cache eviction candidates (e.g., the least recently used or LRU data blocks).

In some cases, the foregoing requested data blocks might be modified locally by the file management application 104. In such cases, the modified instances of data blocks can be moved from the dynamic data regime space 165 to the pending data regime space 164. Such moves among the local cache regime spaces might be performed by modifying certain instances of the cache data attributes 316 associated with the moved data blocks in the local metadata 216. The modified data blocks or pending data (e.g., "dirty" data) can remain in the pending data regime space 164 until uploaded (e.g., see write data blocks $364_1$) and committed (e.g., see committed data 328) at the cloud-based storage environment 260.

In other cases, certain data operations might precipitate an error being returned in the cache access response directives 366. Specifically, for example, marking a certain portion of data for the offline data regime space 163 and/or writing (e.g., moving) a certain portion of data to the pending data regime space 164 might return an error (e.g., error code) since the offline data regime space 163 and/or the pending data regime space 164 can be more restricted as pertains to data eviction flexibility than, for example, the dynamic data regime space 165. Specifically, as an example, eviction of pending data from the pending data regime space 164 can be prohibited by the cache management rules 194 until the pending data is committed at the cloud-based storage environment 260 so that the modifications to the pending data performed locally are not lost.

Figure 4:
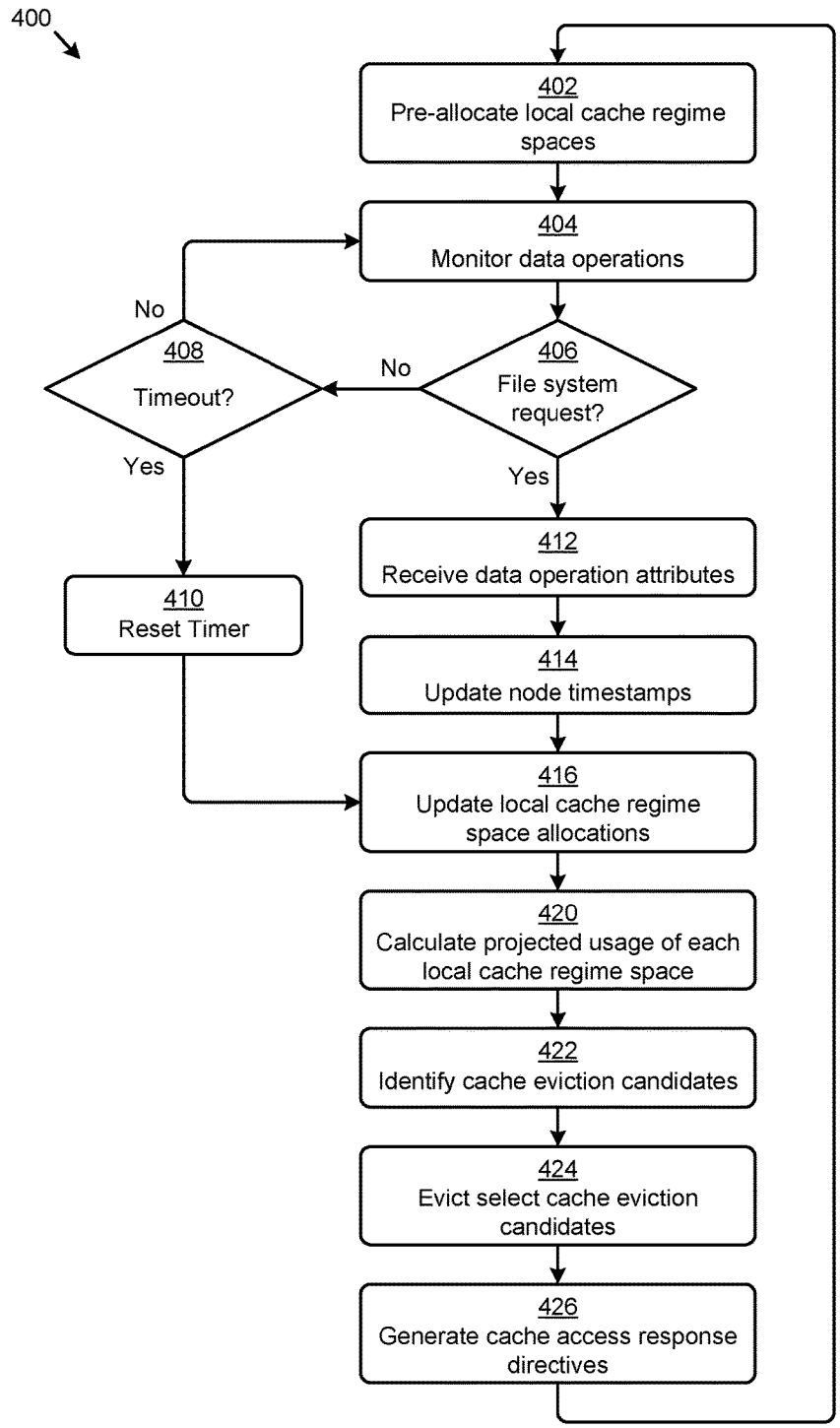
FIG. 4 presents a rules-based multi-regime cache management technique as implemented in a virtual file system in a highly collaborative cloud-based environment, according to an embodiment.

An embodiment of a rules-based multi-regime cache management technique that can be implemented in systems such as are shown and described in FIG. 3 is discussed as pertaining to FIG. 4.

FIG. 4 presents a rules-based multi-regime cache management technique 400 as implemented in a virtual file system in a highly collaborative cloud-based environment. As an option, one or more variations of rules-based multi-regime cache management technique 400 or any aspect thereof may be implemented in the context of the architecture and functionality of the embodiments described herein. The rules-based multi-regime cache management technique 400 or any aspect thereof may be implemented in any environment.

The rules-based multi-regime cache management technique 400 presents one embodiment of certain steps and/or operations for rules-based multi-regime caching on a local user device to facilitate low latency access to and/or synchronization of shared content objects from a cloud-based storage system according to the herein disclosed techniques. In one or more embodiments, the steps and underlying operations shown in the rules-based multi-regime cache management technique 400 can be facilitated, in part, by a cache manager and/or cache management rules at a file system executor of a virtual file system on the local user device such as is shown and described as pertaining to FIG. 2 and throughout this specification. As shown, the rules-based multi-regime cache management technique 400 can commence with pre-allocating one or more local cache regime spaces to the local memory space of the local user device (at step 402). For example, such allocations can be based at least in part on certain cache management rules for calculating the space for each regime based on the available local memory space. More specifically, as an example, certain cache management rules might allocate 1 GB to the dynamic data regime space (e.g., "swap space") from a total of 2.5 GB of free local memory space (FLMS). In some cases, the swap space can be considered a minimum that might be required for sufficient operation of the multi-regime local cache (e.g., to avoid space being taken over by another application). The cache management rules might further limit the total of the offline data regime space and the pending data regime space to 50% of the free local memory space or 1.25 GB. The total allocated cache space (TACS) according to the foregoing cache management rule scenario can be represented in the equation below:

$$TACS = \max(1\ GB, \min(20\ GB, 50\%*FLMS)) \quad [EQ.\ 1]$$

One possible alternative to EQ. 1 is to replace the fixed sizes (1 GB and 20 GB, as shown in EQ. 1) with variables that can take on values from a calculated average file size for a particular user and/or a particular enterprise. Such a scenario can be represented as shows in Equation 2:

$$TACS = \max(AVG\_FILE\_SIZE\_50th\_PERCENTILE*Num\_Files\_Desired,\\ \min(AVG\_FILE\_SIZE\_95th\_PERCENTILE*Num\_Files\_Desired,\\ 50\%*FLMS)) \quad [EQ.\ 2]$$

As such, the variables can be changed based on maximum file size restrictions on a user account (e.g., as may be established by the user's cloud storage billing plan, the enterprise's plan, etc.). The value of the variable AVG_FILE_SIZE_95th_PERCENTILE or its percentile definition can be reduced to be more conservative in allocation of cache space.

With the multi-regime local cache so allocated (e.g., based on a calculation for total allocated cache space), data operations can be monitored (at step 404). If no file system requests are received (see "No" path of decision 406), and no timeout indicator is presented (see "No" path of decision 408), the monitoring of the data operations can continue. If a file system request is detected (see "Yes" path of decision 406) the data operation attributes derived from the file system request can be received (at step 412). In some cases, the file system request can invoke an update of the timestamps associated with the nodes (e.g., files, data, etc.) referenced in the file system request and/or the associated data operation attributes (at step 414). For example, the cache data attributes in the local metadata of the local user device might be updated with the timestamp information. The file system request might also invoke an update to the local cache regime space allocations (at step 416). For example, the TACS from EQ. 1 might be increased or decreased based on a current FLMS value such that certain local cache regime spaces (e.g., offline and pending regime spaces) might be resized accordingly. In some cases, such reallocations of the local cache regime space can be invoked by receiving a timeout indicator as compared to receiving a file system request (see "Yes" path of decision 408). In such cases, the timeout indicator might be associated with the expiration of a timer that can be reset responsive to expiration (at step 410).

The usage of the reallocated local cache regime spaces can then be calculated based on the data operation attributes (at step 420). For example, the data operation attributes might specify a write operation of 350 MB of modified data. Based on the foregoing cache management rule scenario, such a write operation (e.g., to the pending data regime space) would precipitate a breach in the 50% threshold attributed to the combined pending data regime space and the offline data regime space. In such cases (e.g., no free space to perform the data operation), certain cache eviction candidates can be identified (at step 422). For example, certain cache management rules might be used to determine such cache eviction candidates. In some cases, one or more of the cache eviction candidates can be selected for eviction from the cache (at step 424). For example, cache eviction candidates in the dynamic data regime space can be evicted to provide free space for the requested 350 MB write operation. In this case, a set of cache access response directives (e.g., actions to take upon a cache access, which cache regime to use, when to upload, cache access paradigms, cache access philosophies, logic or directives pertaining to LRU ordering, MRU ordering, etc.) can be generated to complete the write operation (at step 426). In other cases, the foregoing evictions might not be possible. For example, no cache eviction candidates from the dynamic data regime space might be identified since the dynamic data comprising the dynamic data regime space is currently in use. In such cases, the generated cache access response directives might comprise an error code to the application issuing the file system request. As another example, cache eviction candidates in the pending data regime space can be evicted to provide free space for the requested write operation. The rules-based multi-regime cache management technique 400 can then return to monitoring for further data operations (at step 404). An embodiment of a dynamic cache sizing technique is shown and discussed as pertaining to FIG. 5.

Figure 5:
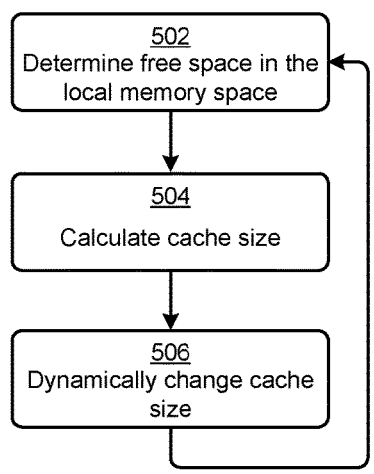
FIG. 5 depicts a dynamic cache sizing technique as implemented in a virtual file system that facilitates rules-based multi-regime caching in a highly collaborative cloud-based environment, according to an embodiment.

FIG. 5 depicts a dynamic cache sizing technique 500 as implemented in a virtual file system that facilitates rules-based multi-regime caching in a highly collaborative cloud-based environment. As an option, one or more variations of dynamic cache sizing technique 500 or any aspect thereof may be implemented in the context of the architecture and functionality of the embodiments described herein. The dynamic cache sizing technique 500 or any aspect thereof may be implemented in any environment.

As earlier described, a local cache (e.g., multi-regime local cache) can be configured using local memory space that holds files and/or portions of file (e.g., data blocks) accessed using a virtual file system at a local user device (e.g., local client). Storing data in the local cache permits faster access to, for example, recently and/or frequently accessed data to avoid retrieving the locally stored data from a remote cloud-based storage system.

Various cache management schemes can be implemented to control the data in the local cache. For example, a least recently use or LRU approach can be applied to evict the least recently used data from the local cache. In some cases, an LRU scheme might be implemented to accommodate a local cache space that is limited in size. In such cases, an LRU approach can prioritize the data held in the local cache. Other cache management techniques and/or cache management rules are possible such as those implemented using the herein disclosed techniques.

As also earlier discussed, legacy approaches to local cache allocation and/or management might allocate a fixed portion of local memory space to a given local cache (e.g., a single regime local cache). The size of such local caches might remain constant independent of changes with the system and/or environment comprising the local cache. In some cases, such legacy cache management (e.g., cache space allocation) approaches can be limited at least as pertaining to dynamically configuring cache sizes responsive to system conditions such as current performance capabilities. The herein disclosed techniques can address such limitations associated with legacy approaches as depicted by the dynamic cache sizing technique 500.

Specifically, the dynamic cache sizing technique 500 can commence by determining the amount of free space currently available in the local memory space (at step 502). For example, the amount of free space on a local hard drive identified as the medium for comprising the local cache can be determined. The size of the local cache can then be calculated based at least in part on the free space (at step 504). For example, the local cache size (LCS) might be calculated using the following equation:

$$LCS=\min((50\%*Free\_Space), Custom\_Cache\_Size\_Limit) \quad [EQ.\ 3]$$

where
Free_Space corresponds to the amount of available free space in the local memory space earlier determined, and Custom_Cache_Size_Limit corresponds to any limits (e.g., 10 GB) that might be imposed based upon certain storage system settings.

For example, according to EQ. 3, if Free_Space is 4 GB and Custom_Cache_Size_Limit is 10 GB, then the local cache size can be 2 GB. The result of the cache size calculation can be used to set and/or change the cache size (at step 506). In some cases, the cache size can be regularly checked and/or set to dynamically adjust the cache size to varying system conditions.

In some embodiments, the data contents of the local cache and/or certain local cache data regime spaces can be dynamically adjusted to facilitate various data operations at the local user device. An example of such dynamic cache content management techniques implemented using the herein disclosed techniques according to some embodiments is described in FIG. 6A and FIG. 6B.

Figure 6A:
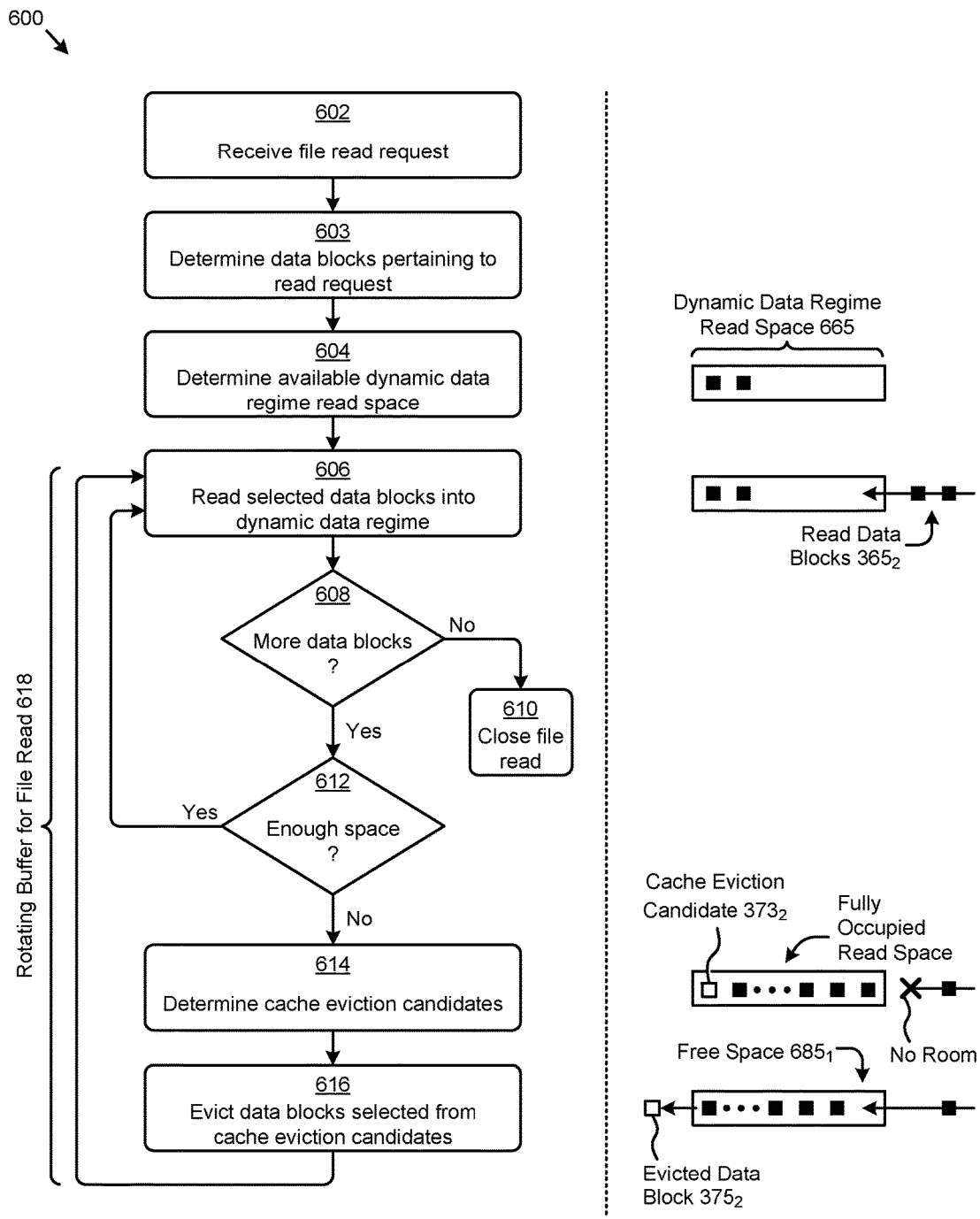
FIG. 6A and FIG. 6B illustrate a rotating cache content technique as implemented in a virtual file system that facilitates rules-based multi-regime caching in a highly collaborative cloud-based environment, according to an embodiment.
Figure 6B:
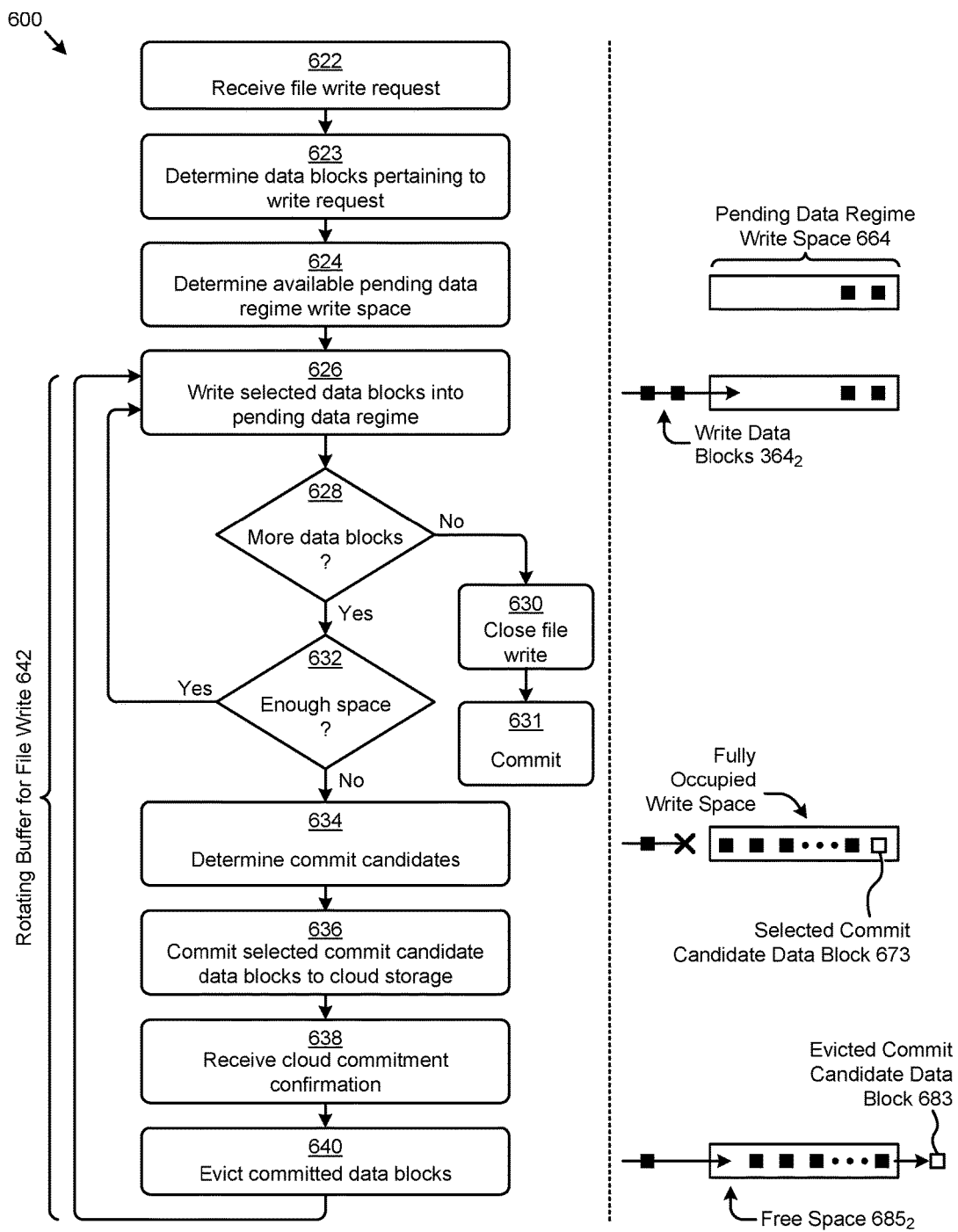

FIG. 6A and FIG. 6B illustrate a rotating cache content technique 600 as implemented in a virtual file system that facilitates rules-based multi-regime caching in a highly collaborative cloud-based environment. As an option, one or more variations of rotating cache content technique 600 or any aspect thereof may be implemented in the context of the architecture and functionality of the embodiments described herein. The rotating cache content technique 600 or any aspect thereof may be implemented in any environment.

FIG. 6A illustrates one embodiment of certain steps and/or operations that implement a rotating buffer for file read (see grouping 618) facilitated by the herein disclosed techniques for rules-based multi-regime caching in a virtual file system interfacing with a highly collaborative cloud-based environment. Specifically, as shown in FIG. 6A, a file read request might be received at the virtual file system (at step 602). The data blocks associated with the file read request can then be determined (at step 603). According to the herein disclosed techniques, the dynamic data regime space can be analyzed to determine the space available to perform the read operation (at step 604). For example, the dynamic data regime read space 665 might represent the space available for performing the read. As illustrated, the dynamic data regime read space 665 can comprise some free space and some occupied space.

Certain selected data blocks (e.g., immediate priority data blocks) can then be read into the dynamic data regime space (at step 606). For example, the read data blocks 365₂ can be read into the dynamic data regime read space 665. If no more data blocks pertaining to the file read request are to be read (see "No" path of decision 608), the file read can be closed (at step 610). If more data blocks pertaining to the file read request are to be read (see "Yes" path of decision 608), the dynamic data regime read space 665 can be checked for sufficient space for the additional data blocks (see decision 612). In some embodiments, certain cache management rules can be used to characterize the space availability. If there is enough space (see "Yes" path of decision 612), then more data blocks can be selected for reading into the dynamic data regime space (at step 606). If there is not sufficient space (see "No" path of decision 612), then one or more cache eviction candidates can be determined (at step 614). For example, a cache eviction candidate 373₂ might be identified from within the fully occupied read space based on one or more cache management rules and/or cache management parameters (e.g., LRU timestamps). One or more evicted data blocks (e.g., evicted data block 375₂) selected from the cache eviction can be evicted to provide a free space 685₁ in the dynamic data regime read space 665 to facilitate the read of additional data blocks (at step 616).

Referring to FIG. 6B, the figure illustrates one embodiment of certain steps and/or operations that implement a rotating buffer for file write (see grouping 642) facilitated by the herein disclosed techniques for rules-based multi-regime caching in a virtual file system interfacing with a highly collaborative cloud-based environment. Specifically, as shown in FIG. 6B, a file write request might be received at the virtual file system (at step 622). The data blocks associated with the file write request can then be determined (at step 623). According to the herein disclosed techniques, the pending data regime space can be analyzed to determine the space available to perform the write operation (at step 624). For example, the pending data regime write space 664 might represent the space available for performing the write. As illustrated, the pending data regime write space 664 can comprise some free space and some occupied space.

Certain selected data blocks (e.g., immediate priority data blocks) can then be written into the pending data regime space (at step 626). For example, the write data blocks 364₂ can be written into the pending data regime write space 664. If no more data blocks pertaining to the file write request are to be written (see "No" path of decision 628), the file write can be closed (at step 630) and any remaining data blocks can be committed (at step 631). Some embodiments write data blocks to cloud storage (e.g., with or without a commit operation or flag).

If more data blocks pertaining to the file write request are to be written (see "Yes" path of decision 628), the pending data regime write space 664 can be checked for sufficient space for the additional data blocks (see decision 632). In some embodiments, certain cache management rules can be used to characterize the space availability. If there is enough space (see "Yes" path of decision 632), then more data blocks can be selected for writing into the pending data regime space (at step 626). If there is not sufficient space (see "No" path of decision 632), then one or more commit candidates from the pending data regime write space can be determined (at step 634).

One or more selected commit candidate data blocks from the commit candidates can be selected for committing to the cloud-based storage environment (at step 636). For example, a selected commit candidate data block 673 might be identified as being one of the data blocks being held in the fully occupied write space based on one or more cache management rules and/or cache management parameters (e.g., timestamp). When the commit confirmation is received from the cloud-based storage environment (at step 638), the selected commit candidate data block can be evicted from the pending data regime write space 664 (at step 640). For example, the evicted commit candidate data block 683 corresponding to the selected commit candidate data block 673 can be evicted to provide a free space 685₂ in the pending data regime write space 664 to facilitate the write of additional data blocks.

Figure 6C:
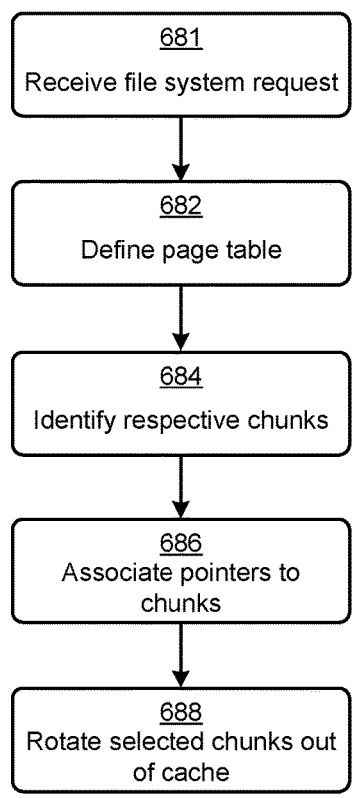
FIG. 6C illustrates a rotating chunk caching technique as implemented in a virtual file system that facilitates rules-based multi-regime caching in a highly collaborative cloud-based environment, according to an embodiment.

FIG. 6C illustrates a rotating chunk caching technique 6C00 as implemented in a virtual file system that facilitates rules-based multi-regime caching in a highly collaborative cloud-based environment. As an option, one or more variations of rotating chunk caching technique 6C00 or any aspect thereof may be implemented in the context of the architecture and functionality of the embodiments described herein. The rotating chunk caching technique 6C00 or any aspect thereof may be implemented in any environment.

FIG. 6C illustrates one embodiment of certain steps and/or operations that implement a rotating chunk caching technique 6C00 facilitated by the herein disclosed techniques for rules-based multi-regime caching in a virtual file system interfacing with a highly collaborative cloud-based environment. Specifically, as shown in FIG. 6C, a file system request can be received (at step 681). For example, the file system request might precipitate storing certain portions of a file in a local cache according to the herein disclosed techniques. Responsive to receiving the file system request, a page table can be defined for the file (at step 682). For example, the page table can comprise entries for various portions of the file. Certain chunks can be identified to represent a respective portion of the file (at step 684). For example, each chunk might correspond to a fixed-size portion (e.g., 4 kB) of the file. Each of the foregoing chunks can then be associated with pointers in the page table (at step 686). For example, such pointers can identify the physical and/or logical locations of the chunks. Certain chunks can be selected for rotation (e.g., eviction) out of the local cache based on certain events (at step 688). For example, chunk eviction can be triggered by a threshold breach associated with a certain local cache regime space. In such cases, the least recently used and/or the oldest chunks might be selected for eviction.

Figure 7A:
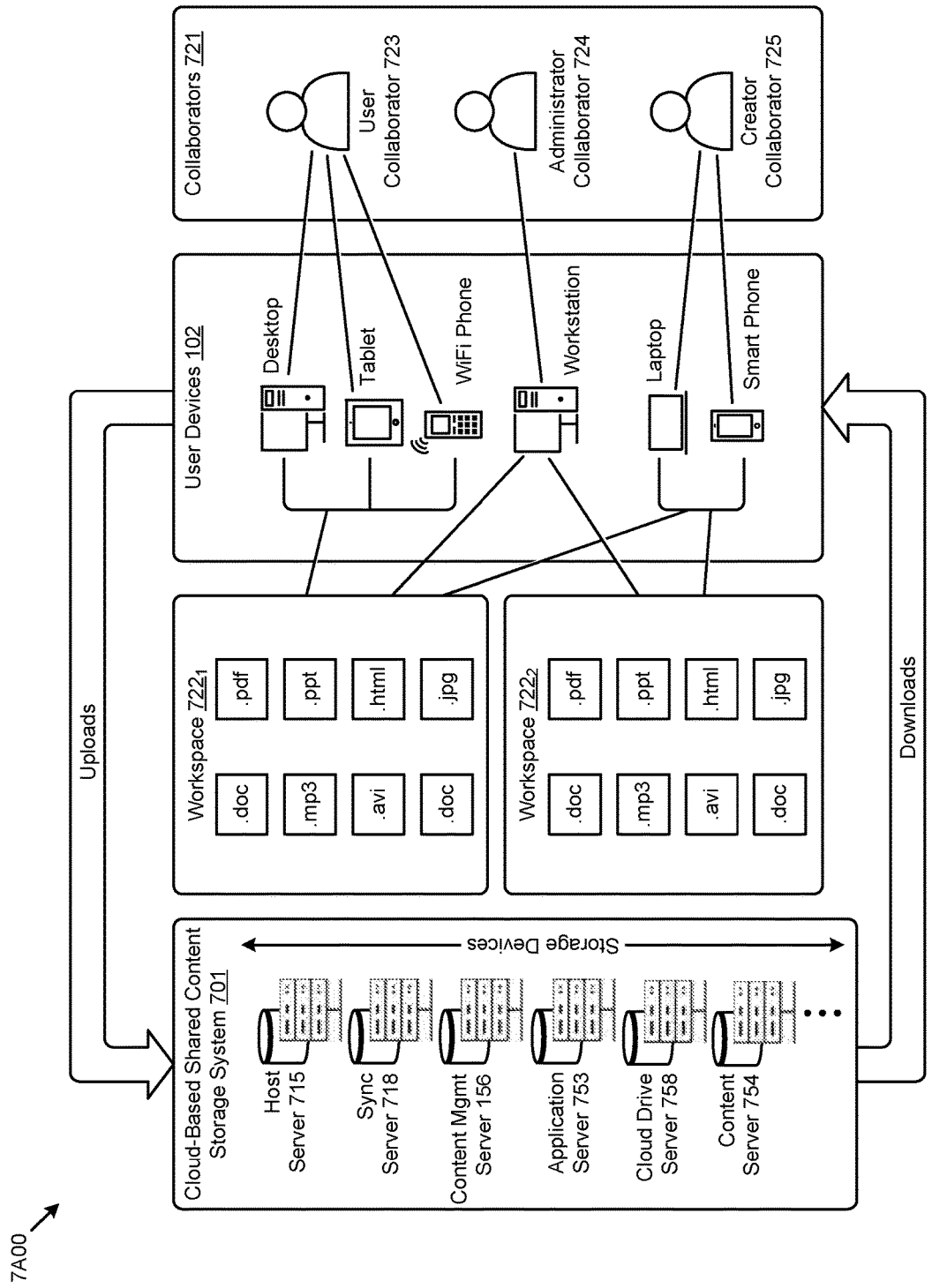
FIG. 7A depicts a cloud-based environment including a collaborative cloud-based shared content management platform that uses a rules-based multi-regime caching in a virtual file system, according to an embodiment.

FIG. 7A depicts a cloud-based environment 7A00 including a collaborative cloud-based shared content management platform that uses a rules-based multi-regime caching in a virtual file system. As an option, one or more variations of cloud-based environment 7A00 or any aspect thereof may be implemented in the context of the architecture and functionality of the embodiments described herein. The cloud-based environment 7A00 or any aspect thereof may be implemented in any environment.

As shown, certain users (e.g., collaborators 721) having various collaboration roles (e.g., user collaborator 723, administrator collaborator 724, creator collaborator 725, etc.) can use one or more instances of user devices 102 to interact with one or more workspaces (e.g., workspace $722_1$, workspace $722_2$, etc.) within the cloud-based environment 7A00. The workspaces can be stored in any location, and are at least partially maintained by components within a cloud-based shared content storage system 701. The cloud-based shared content storage system 701 supports any variety of processing elements and/or storage devices (e.g., a storage filer, a storage facility, etc.) and/or servers such as a host server 715, a sync server 718, a content management server 156, an application server 753, a cloud drive server 758, a content server 754, and/or other processing elements.

Any of the users can access shared content from the cloud-based shared content storage system 701 without the additional process of manually downloading and storing a file locally on an instance of the user devices 102 such as a desktop computer, a tablet, a WiFi phone, a workstation, a laptop, a smart phone, and/or other user devices. For example, a content object (e.g., computer file, text document, audio file, video file, image file, etc.) created by the creator collaborator 725 might be viewed by the user collaborator 723 without informing the user collaborator 723 where the file is physically stored in the storage devices. Such a facility streamlines the frequently repeated sharing and collaboration processes.

Functions and techniques performed by the cloud-based shared content storage system 701 and/or the client side components (e.g., user devices 102, a collaboration client and/or application on an instance of the user devices 102, etc.) are described herein with further details and with reference to several examples. Further details pertaining to implementing the herein disclosed techniques in the cloud-based environment 7A00 are described in FIG. 7B.

Figure 7B:
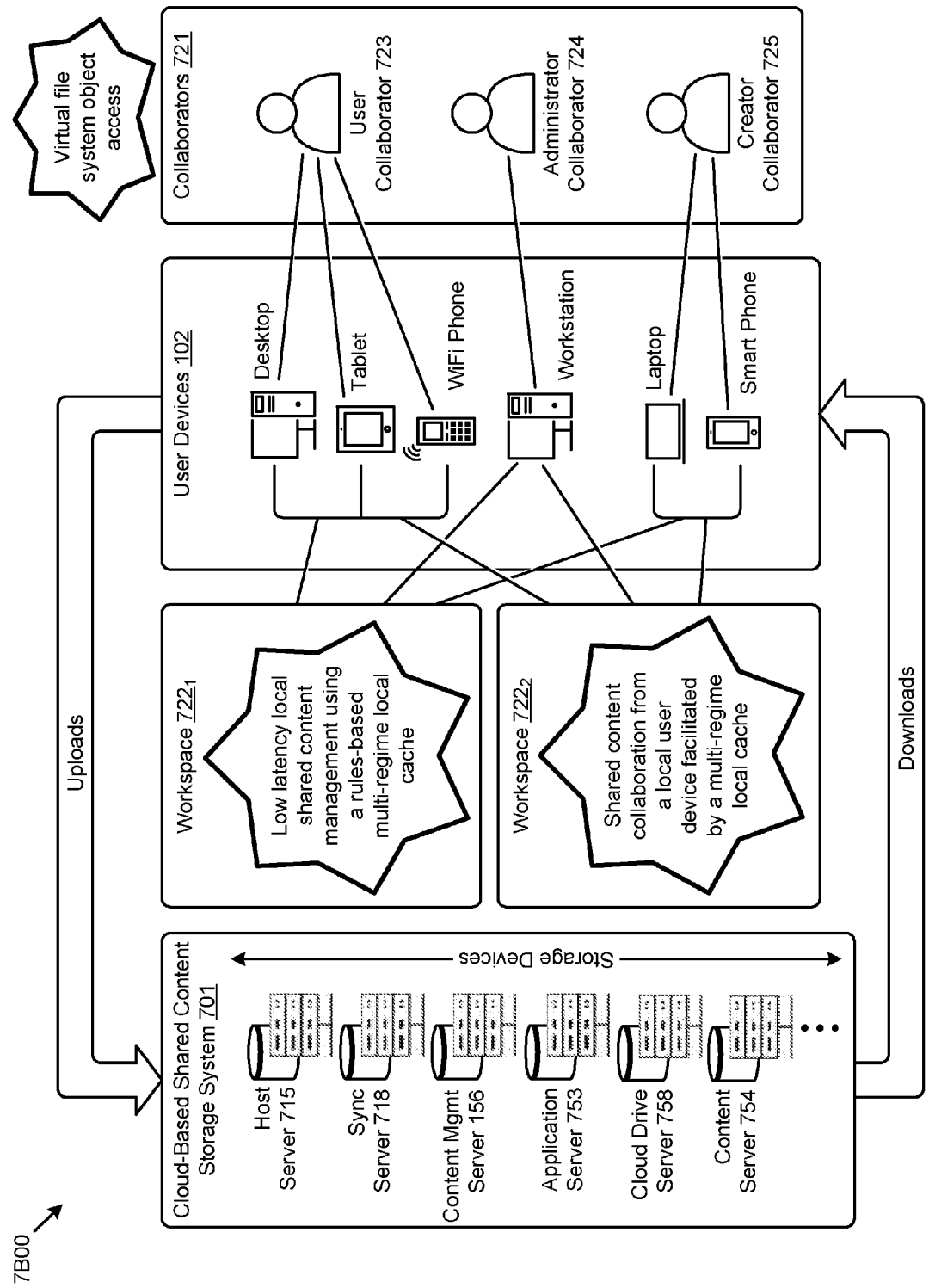
FIG. 7B presents a schematic view of a cloud-based environment showing low latency workspace responsivity derived from use of a rules-based multi-regime caching system, according to an embodiment.

FIG. 7B presents a schematic view 7B00 of a cloud-based environment showing low latency workspace responsivity derived from use of a rules-based multi-regime caching system. As an option, one or more variations of schematic view 7B00 or any aspect thereof may be implemented in the context of the architecture and functionality of the embodiments described herein. The schematic view 7B00 or any aspect thereof may be implemented in any environment.

The embodiment shown in FIG. 7B is merely one example of various activities and/or operations facilitated by the herein disclosed techniques for rules-based multi-regime caching in a virtual file system in a highly collaborative cloud-based environment. Specifically, as shown, the collaborators 721 (e.g., the user collaborator 723, the administrator collaborator 724, and the creator collaborator 725) in the cloud-based environment might use an instance of the virtual file system on one or more of the user devices 102 to access various shared content (e.g., objects) stored in the storage devices of the cloud-based shared content storage system 701. As shown in workspace $722_1$, the herein disclosed virtual file system techniques can facilitate low latency local shared content management using a rules-based multi-regime local cache (e.g., at each instance of the user devices 102). Further, as shown in workspace $722_2$, the herein disclosed virtual file system techniques can also facilitate shared content collaboration from a local user device facilitated by a multi-regime local cache.

ADDITIONAL EMBODIMENTS OF THE DISCLOSURE

Additional Practical Application Examples

Figure 8A:
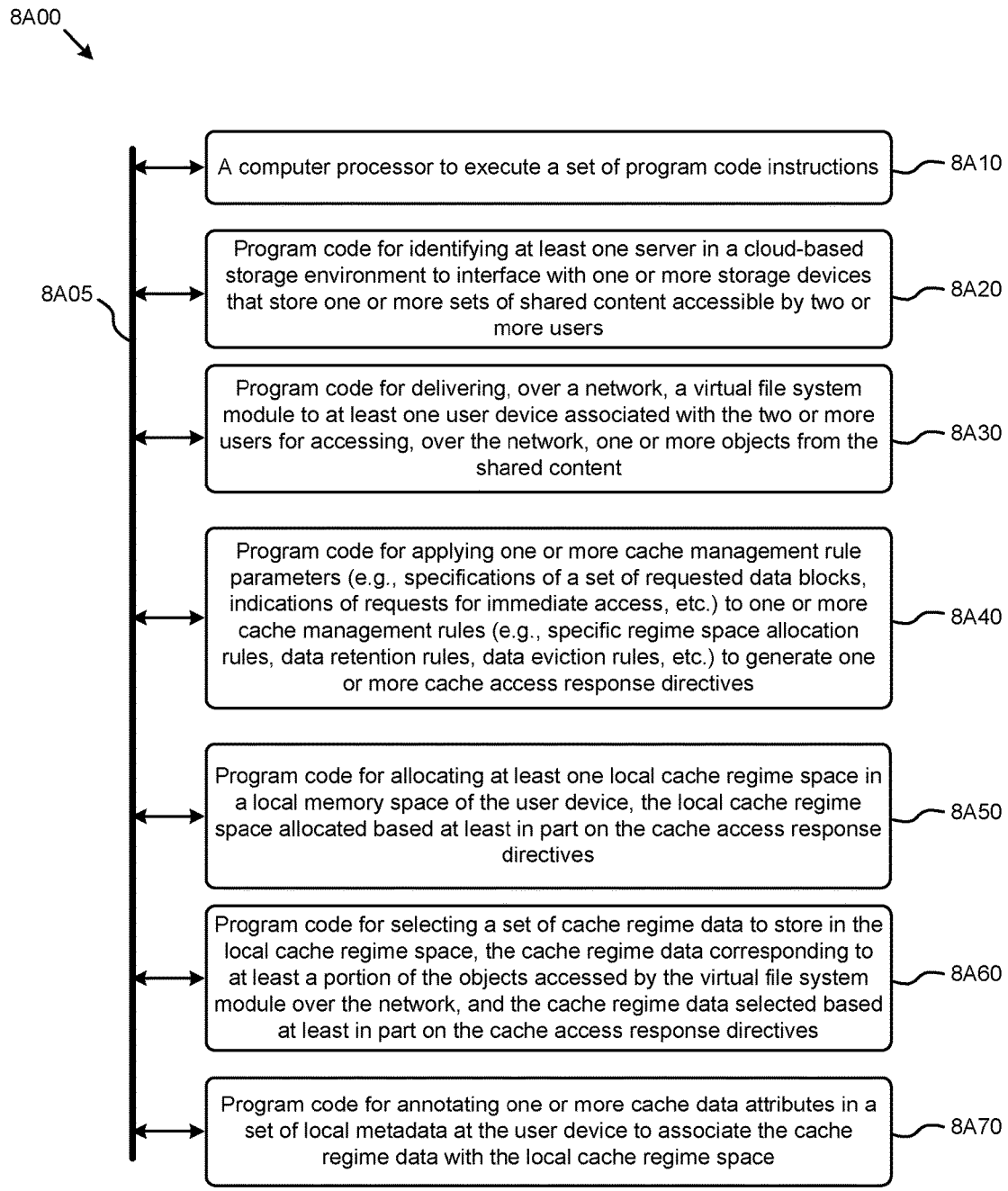
FIG. 8A and FIG. 8B depict system components as arrangements of computing modules that are interconnected so as to implement certain of the herein-disclosed embodiments.

FIG. 8A depicts a system 8A00 as an arrangement of computing modules that are interconnected so as to operate cooperatively to implement certain of the herein-disclosed embodiments. The partitioning of system 8A00 is merely illustrative and other partitions are possible. As an option, the system 8A00 may be implemented in the context of the architecture and functionality of the embodiments described herein. Of course, however, the system 8A00 or any operation therein may be carried out in any desired environment.

The system 8A00 comprises at least one processor and at least one memory, the memory serving to store program instructions corresponding to the operations of the system. As shown, an operation can be implemented in whole or in part using program instructions accessible by a module. The modules are connected to a communication path 8A05, and any operation can communicate with other operations over communication path 8A05. The modules of the system can, individually or in combination, perform method operations within system 8A00. Any operations performed within system 8A00 may be performed in any order unless as may be specified in the claims.

The shown embodiment implements a portion of a computer system, presented as system 8A00, comprising a computer processor to execute a set of program code instructions (see module 8A10) and modules for accessing memory to hold program code instructions to perform: identifying at least one server in a cloud-based storage environment to interface with one or more storage devices that store one or more sets of shared content accessible by two or more users (see module 8A20); delivering, over a network, a virtual file system module to at least one user device associated with the two or more users for accessing, over the network, one or more objects from the shared content (see module 8A30); applying one or more cache management rule parameters (e.g., specifications of a set of requested data blocks, indications of requests for immediate access, etc.) to one or more cache management rules (e.g., specific regime space allocation rules, data retention rules, data eviction rules, etc.) to generate one or more cache access response directives (see module 8A40); allocating at least one local cache regime space in a local memory space of the user device, the local cache regime space allocated based at least in part on the cache access response directives (see module 8A50); selecting a set of cache regime data to store in the local cache regime space, the cache regime data corresponding to at least a portion of the objects accessed by the virtual file system module over the network, and the cache regime data selected based at least in part on the cache access response directives (see module 8A60); and annotating one or more cache data attributes in a set of local metadata at the user device to associate the cache regime data with the local cache regime space (see module 8A70).

Variations of the foregoing may include more or fewer of the shown modules and variations may perform more or fewer (or different) steps, and/or may use data elements in more, or in fewer or different operations.

Strictly as examples, some variations include:

Variations that comprise moving the cache regime data from the local cache regime space to a second local cache regime space by updating the cache data attributes to associate the cache regime data with the second local cache regime space.

Variations that comprise applying the cache management rule parameters to the cache management rules.

Variations where allocating the local cache regime space in the local memory space of the user device is responsive to at least one of, a file system request, a timeout indicator, a threshold breach, or a commit confirmation.

Variations that comprise determining one or more cache eviction candidates comprising at least one data block from the cache regime data, the cache eviction candidates identified based at least in part on the cache access response directives.

Variations that comprise evicting one or more evicted data blocks from the cache eviction candidates to provide a free space in the local cache regime space corresponding to the evicted data blocks.

Variations where at least one of, determining the cache eviction candidates, or evicting the evicted data blocks, is responsive to at least one of, a file system request, a timeout indicator, a threshold breach, or a commit confirmation.

Variations where the cache regime data comprises a set of pending data to be committed to the shared content of the cloud-based storage environment.

Variations that comprise determining one or more commit candidates comprising at least one data block from the pending data, the commit candidates identified based at least in part on the cache access response directives.

Variations that comprise committing, to the cloud-based storage environment, one or more selected commit candidate data blocks from the commit candidates.

Variations that comprise receiving, from the cloud-based storage environment, a commit confirmation responsive to committing the selected commit candidate data blocks.

Variations that comprise evicting (e.g., responsive to receiving the commit confirmation), one or more evicted commit candidate data blocks from the selected commit candidate data blocks to provide a free space in the local cache regime space corresponding to the evicted commit candidate data blocks.

Variations where the cache regime data comprises a set of offline data available for access at the user device when the user device is disconnected from the network.

Variations where the cache regime data comprises a set of dynamic data, the dynamic data comprising one or more read data blocks received over the network from the cloud-based storage environment responsive to at least one file system request.

Variations where the cache management rule parameters comprise one or more attributes characterizing at least one of, an object identifier, an offset, an operation, a range, a set of data, a data block identifier, a timestamp, a local cache regime space identifier, an allocated cache regime space value, a used cache regime space value, or one or more threshold values.

Variations where the cache regime data comprises one or more data blocks, and

Variations where the cache access response directives characterize at least one error code.

Figure 8B:
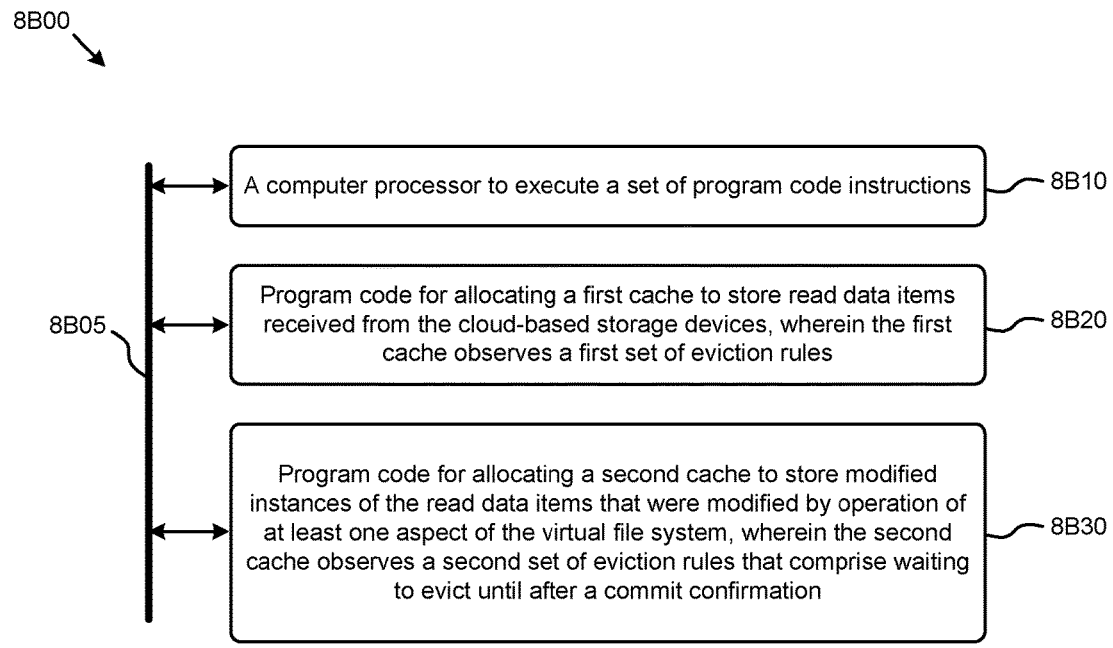

FIG. 8B depicts a system 8B00 as an arrangement of computing modules that are interconnected so as to operate cooperatively to implement certain of the herein-disclosed embodiments. The partitioning of system 8B00 is merely illustrative and other partitions are possible. As an option, the system 8B00 may be implemented in the context of the architecture and functionality of the embodiments described herein. Of course, however, the system 8B00 or any operation therein may be carried out in any desired environment. The system 8B00 comprises at least one processor and at least one memory, the memory serving to store program instructions corresponding to the operations of the system. As shown, an operation can be implemented in whole or in part using program instructions accessible by a module. The modules are connected to a communication path 8B05, and any operation can communicate with other operations over communication path 8B05. The modules of the system can, individually or in combination, perform method operations within system 8B00. Any operations performed within system 8B00 may be performed in any order unless as may be specified in the claims. The shown embodiment implements a portion of a computer system, presented as system 8B00, comprising a computer processor to execute a set of program code instructions (see module 8B 10) and modules for accessing memory to hold program code instructions to perform: allocating a first cache to store read data items received from the cloud-based storage devices, wherein the first cache observes a first set of eviction rules (see module 8B20); and allocating a second cache to store modified instances of the read data items that were modified by operation of at least one aspect of the virtual file system, wherein the second cache observes a second set of eviction rules that comprise waiting to evict until after a commit confirmation (see module 8B30).

SYSTEM ARCHITECTURE OVERVIEW

Additional System Architecture Examples

Figure 9A:
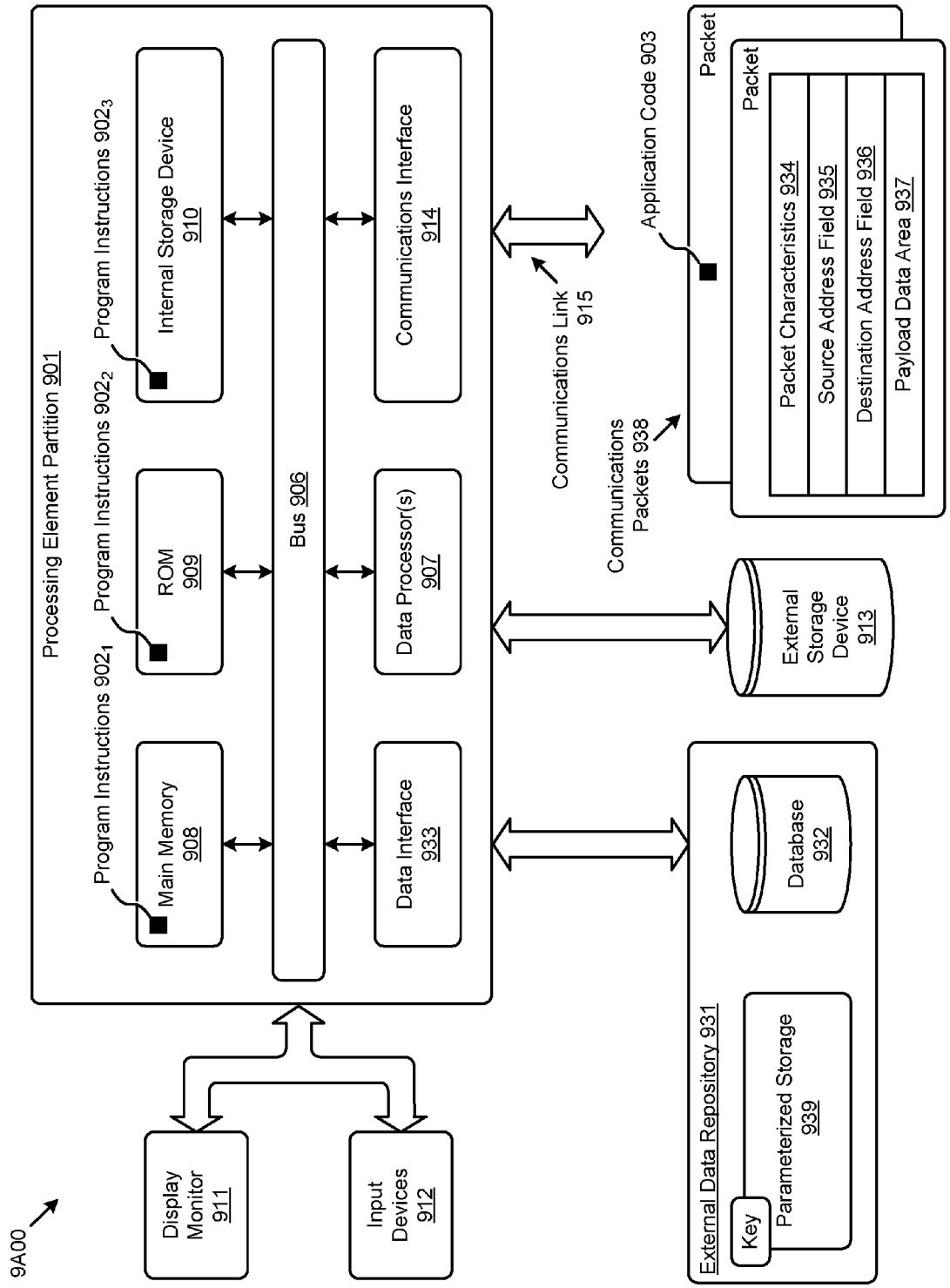
FIG. 9A and FIG. 9B present block diagrams of computer system architectures having components suitable for implementing embodiments of the present disclosure, and/or for use in the herein-described environments.

FIG. 9A depicts a block diagram of an instance of a computer system 9A00 suitable for implementing embodiments of the present disclosure. Computer system 9A00 includes a bus 906 or other communication mechanism for communicating information. The bus interconnects subsystems and devices such as a central processing unit (CPU), or a multi-core CPU (e.g., data processor 907), a system memory (e.g., main memory 908, or an area of random access memory (RAM)), a non-volatile storage device or non-volatile storage area (e.g., read-only memory 909), an internal storage device 910 or external storage device 913 (e.g., magnetic or optical), a data interface 933, a communications interface 914 (e.g., PHY, MAC, Ethernet interface, modem, etc.). The aforementioned components are shown within processing element partition 901, however other partitions are possible. The shown computer system 9A00 further comprises a display 911 (e.g., CRT or LCD), various input devices 912 (e.g., keyboard, cursor control), and an external data repository 931.

According to an embodiment of the disclosure, computer system 9A00 performs specific operations by data processor 907 executing one or more sequences of one or more program code instructions contained in a memory. Such instructions (e.g., program instructions $902_1$, program instructions $902_2$, program instructions $902_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 9A00 performs specific networking operations using one or more instances of communications interface 914. Instances of the communications interface 914 may comprise one or more networking ports that are configurable (e.g., pertaining to speed, protocol, physical layer characteristics, media access characteristics, etc.) and any particular instance of the communications interface 914 or port thereto can be configured differently from any other particular instance. Portions of a communication protocol can be carried out in whole or in part by any instance of the communications interface 914, and data (e.g., packets, data structures, bit fields, etc.) can be positioned in storage locations within communications interface 914, or within system memory, and such data can be accessed (e.g., using random access addressing, or using direct memory access DMA, etc.) by devices such as data processor 907.

The communications link 915 can be configured to transmit (e.g., send, receive, signal, etc.) any types of communications packets 938 comprising any organization of data items. The data items can comprise a payload data area 937, a destination address 936 (e.g., a destination IP address), a source address 935 (e.g., a source IP address), and can include various encodings or formatting of bit fields to populate the shown packet characteristics 934. In some cases the packet characteristics include a version identifier, a packet or payload length, a traffic class, a flow label, etc. In some cases the payload data area 937 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 907 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 931, which in turn can be formatted into any one or more storage areas, and which can comprise parameterized storage 939 accessible by a key (e.g., filename, table name, block address, offset address, etc.).

Execution of the sequences of instructions to practice certain embodiments of the disclosure are performed by a single instance of the computer system 9A00. According to certain embodiments of the disclosure, two or more instances of computer system 9A00 coupled by a communications link 915 (e.g., LAN, PTSN, or wireless network) may perform the sequence of instructions required to practice embodiments of the disclosure using two or more instances of components of computer system 9A00.

The computer system 9A00 may transmit and receive messages such as data and/or instructions organized into a data structure (e.g., communications packets). The data structure can include program instructions (e.g., application code 903), communicated through communications link 915 and communications interface 914. Received program code may be executed by data processor 907 as it is received and/or stored in the shown storage device or in or upon any other non-volatile storage for later execution. Computer system 9A00 may communicate through a data interface 933 to a database 932 on an external data repository 931. Data items in a database can be accessed using a primary key (e.g., a relational database primary key).

The processing element partition 901 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 907. Some embodiments include one or more special-purpose hardware components (e.g., power control, logic, sensors, transducers, etc.). A module may include one or more state machines and/or combinational logic used to implement or facilitate the operational and/or performance characteristics of rules-based multi-regime caching in a virtual file system.

Various implementations of the database 932 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of rules-based multi-regime caching in a virtual file system). Such files or records can be brought into and/or stored in volatile or non-volatile memory.

Figure 9B:
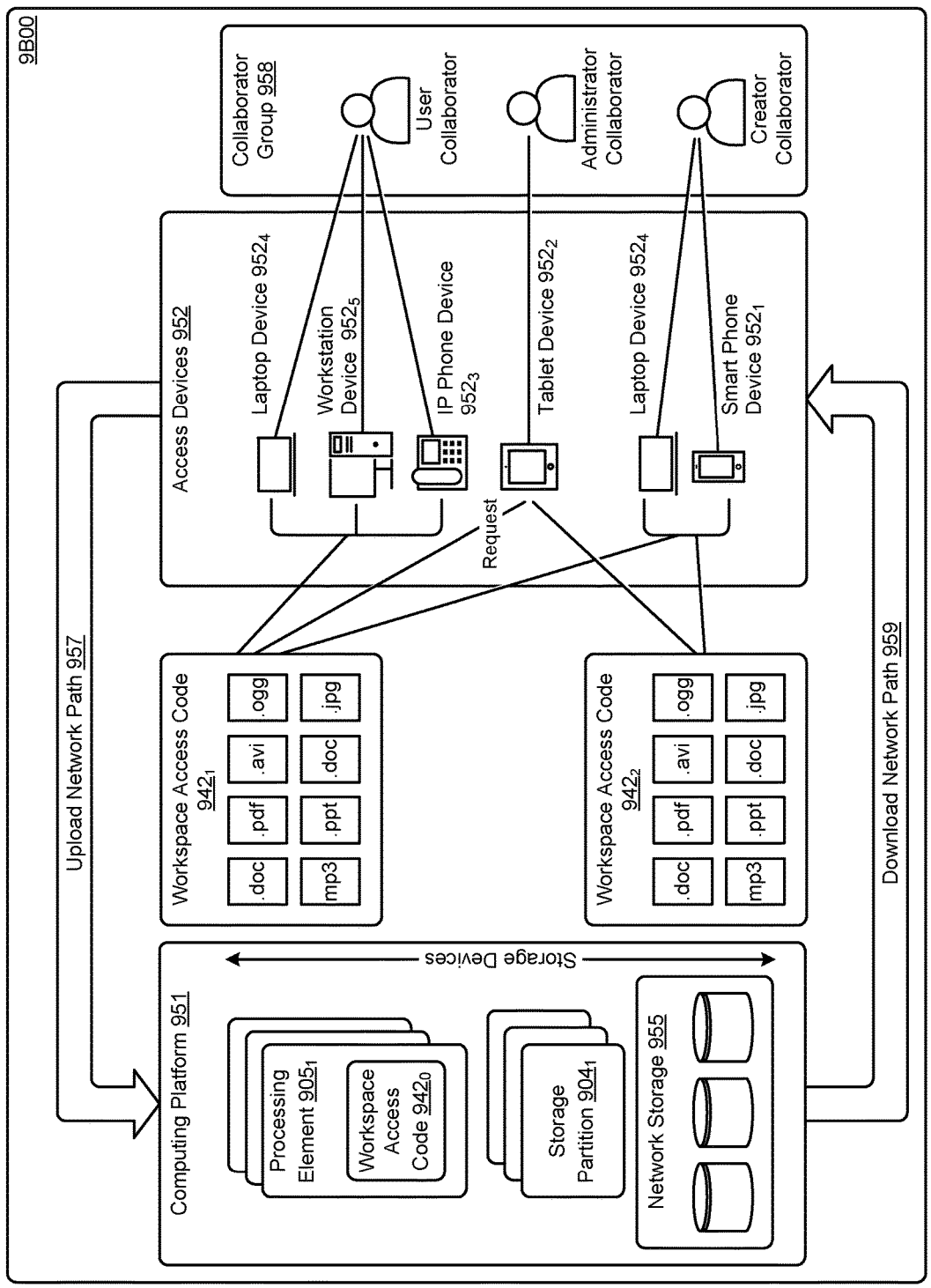

FIG. 9B depicts a block diagram of an instance of a cloud-based environment 9B00. Such a cloud-based environment supports access to workspaces through the execution of workspace access code (e.g., workspace access code $942_0$, workspace access code $942_1$, and workspace access code $942_2$). Workspace access code can be executed on any of the shown access devices 952 (e.g., laptop device $952_4$, workstation device $952_5$, IP phone device $952_3$, tablet device $952_2$, smart phone device $952_1$, etc.). A group of users can form a collaborator group 958, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Also, a portion of the workspace access code can reside in and be executed on any computing platform 951, including in a middleware setting. As shown, a portion of the workspace access code resides in and can be executed on one or more processing elements (e.g., processing element $905_1$). The workspace access code can interface with storage devices such as the shown networked storage 955. Storage of workspaces and/or any constituent files or objects, and/or any other code or scripts or data can be stored in any one or more storage partitions (e.g., storage partition $904_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 957). A stored workspace can be delivered to a particular user and/or shared with other particular users via a download (e.g., a download from a processing element to an access device over a download network path 959).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
    maintaining a virtual file system (VFS) on a user device, wherein the VFS generates a representation of a shared content for an application at the user device, the shared content stored at a cloud-based storage system;
    allocating a first cache, the first cache storing read data items received from the cloud-based storage system, the read data items corresponding to one or more data blocks of the shared content for generating the representation of the shared content, wherein the first cache observes a first eviction rule for the read data items stored in the first cache of the VFS; and
    allocating a second cache, the second cache storing modified instances of the read data items that were modified by operation of at least one aspect of the VFS, wherein the second cache observes a second eviction rule that comprises waiting to evict the modified instances of the read data items until after a commit confirmation is received from the cloud-based storage system.

2. The method of claim 1, wherein the first eviction rule comprises a least recently used algorithm.

3. The method of claim 1, wherein the second eviction rule comprises an evict only after commit rule that allows a data item to be evicted only after receiving a successful write operation confirmation from the cloud-based storage system.

4. The method of claim 1, further comprising applying a first cache management rule parameter to the first eviction rule, and applying a second cache management rule parameter to the second eviction rule.

5. The method of claim 4, wherein the cache management rule parameter comprises one or more attributes characterizing at least one of, an object identifier, or an offset, or an operation, or a range, or a set of data, or a data block identifier, or a timestamp, or a local cache regime space identifier, or an allocated cache regime space value, or a used cache regime space value, or one or more threshold values, or any combination thereof.

6. The method of claim 1, further comprising allocating local cache regime space in a local memory wherein allocating the local cache regime space in the local memory of the user device, is responsive to at least one of, a file system request, or a timeout indicator, or a threshold breach, or a commit confirmation or any combination thereof.

7. The method of claim 1, further comprising determining one or more cache eviction candidates comprising at least one data block from the first cache, the cache eviction candidates being determined based at least in part on one or more cache access response directives.

8. The method of claim 7, wherein at least one of, determining the cache eviction candidates is responsive to at least one of, a file system request, a timeout indicator, a threshold breach, or a commit confirmation, or any combination thereof.

9. The method of claim 1, wherein the modified instances of the read data items comprise a set of pending data to be committed to the shared content of the cloud-based storage system.

10. The method of claim 1, further comprising allocating a third cache to store a set of offline data available on the user device when the user device is disconnected from the network.

11. A computer readable medium, embodied in a non-transitory computer readable medium, the non-transitory computer readable medium having stored thereon a sequence of instructions which, when stored in memory and executed by a processor causes the processor to perform a set of acts, the acts comprising:
maintaining a virtual file system (VFS) on a user device, wherein the VFS generates a representation of a shared content for an application at the user device, the shared content stored at a cloud-based storage system;
allocating a first cache, the first cache storing read data items received from the cloud-based storage system, the read data items corresponding to one or more data blocks of the shared content for generating the representation of the shared content, wherein the first cache observes a first eviction rule for the read data items stored in the first cache of the VFS; and
allocating a second cache, the second cache storing modified instances of the read data items that were modified by operation of at least one aspect of the VFS, wherein the second cache observes a second eviction rule that comprises waiting to evict the modified instances of the read data items until after a commit confirmation is received from the cloud-based storage system.

12. The computer readable medium of claim 11, wherein the first eviction rule comprises a least recently used algorithm.

13. The computer readable medium of claim 11, wherein the second eviction rule comprises an evict only after commit rule that allows a data item to be evicted only after receiving a successful write operation confirmation from the cloud-based storage system.

14. The computer readable medium of claim 11, further comprising instructions which, when stored in memory and executed by the processor causes the processor to perform acts of applying a first cache management rule parameter to the first eviction rule, and applying a second cache management rule parameter to the second eviction rule.

15. The computer readable medium of claim 14, wherein the cache management rule parameter comprises one or more attributes characterizing at least one of, an object identifier, or an offset, or an operation, or a range, or a set of data, or a data block identifier, or a timestamp, or a local cache regime space identifier, or an allocated cache regime space value, or a used cache regime space value, or one or more threshold values, or any combination thereof.

16. The computer readable medium of claim 11, further comprising instructions which, when stored in memory and executed by the processor causes the processor to perform acts of allocating local cache regime space in a local memory wherein allocating the local cache regime space in the local memory of the user device, is responsive to at least one of, a file system request, or a timeout indicator, or a threshold breach, or a commit confirmation or any combination thereof.

17. The computer readable medium of claim 11, further comprising instructions which, when stored in memory and executed by the processor causes the processor to perform acts of determining one or more cache eviction candidates comprising at least one data block from the first cache, the cache eviction candidates being determined based at least in part on one or more cache access response directives.

18. The computer readable medium of claim 17, wherein at least one of, determining the cache eviction candidates is responsive to at least one of, a file system request, a timeout indicator, a threshold breach, or a commit confirmation, or any combination thereof.

19. A system comprising:
a storage medium having stored thereon a sequence of instructions; and
a processor or processors that execute the instructions to cause the processor or processors to perform a set of acts, the acts comprising,
maintaining a virtual file system (VFS) on a user device, wherein the VFS generates a representation of a shared content for an application at the user device, the shared content stored at a cloud-based storage system,
allocating a first cache, the first cache storing read data items received from the cloud-based storage system, the read data items corresponding to one or more data blocks of the shared content for generating the representation of the shared content, wherein the first cache observes a first eviction rule for the read data items stored in the first cache of the VFS, and
allocating a second cache, the second cache storing modified instances of the read data items that were modified by operation of at least one aspect of the VFS, wherein the second cache observes a second eviction rule that comprises waiting to evict the modified instances of the read data items until after a commit confirmation is received from the cloud-based storage system.

20. The system of claim 19, wherein the second eviction rule comprises an evict only after commit rule that allows a data item to be evicted only after receiving a successful write operation confirmation from the cloud-based storage system.

* * * * *